US010040525B2

(12) United States Patent
Salters et al.

(10) Patent No.: US 10,040,525 B2
(45) Date of Patent: Aug. 7, 2018

(54) ANTI-FOULING SYSTEM USING ENERGY HARVESTED FROM SALT WATER

(71) Applicant: KONINKLIJKE PHILIPS N.V., Eindhoven (NL)

(72) Inventors: Bart Andre Salters, Eindhoven (NL); Adrianus Sempel, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/315,171

(22) PCT Filed: Jun. 19, 2015

(86) PCT No.: PCT/EP2015/063787
§ 371 (c)(1),
(2) Date: Nov. 30, 2016

(87) PCT Pub. No.: WO2016/000980
PCT Pub. Date: Jan. 7, 2016

(65) Prior Publication Data
US 2017/0190397 A1 Jul. 6, 2017

(30) Foreign Application Priority Data
Jun. 30, 2014 (EP) .................................... 14175041

(51) Int. Cl.
*B63B 59/04* (2006.01)
*B01J 19/12* (2006.01)
(Continued)

(52) U.S. Cl.
CPC ............. *B63B 59/04* (2013.01); *B01J 19/123* (2013.01); *B08B 17/02* (2013.01); *B63B 59/08* (2013.01);
(Continued)

(58) Field of Classification Search
USPC ............................ 250/504 R, 455.11, 454.11
See application file for complete search history.

(56) References Cited

U.S. PATENT DOCUMENTS

2004/0262233 A1* 12/2004 Yano ........................ C02F 1/008
210/745
2005/0077732 A1 4/2005 Baarman et al.
(Continued)

FOREIGN PATENT DOCUMENTS

JP S5615290 A 6/1981
JP 7211331 A 8/1995
(Continued)

OTHER PUBLICATIONS

Bueley, "UV Irradiation: A New Kind of Antifoulant", Downloaded From http://www.ocean-news.com/feature-story/ocean-news-technology/2014/03/04/february-uf-irradiation-a-new-kind-of-antifoulant, 2014, pp. 1-8.

*Primary Examiner* — Kiet T Nguyen

(57) ABSTRACT

The invention provides an anti-fouling lighting system (1) configured for preventing or reducing biofouling on a fouling surface (1201) of an object (1200) that during use is at least temporarily exposed to a liquid, by providing an anti-fouling light (211) to said fouling surface (1201), the anti-fouling lighting system (1) comprising: —a lighting module (200) comprising a light source (210) configured to generate an anti-fouling light (211); and —an energy system (500) configured to locally harvest energy and configured to provide electrical power to said light lighting module (200), wherein the energy system (500) comprises (i) a sacrificial electrode (510), and (ii) a second energy system electrode (520), wherein the energy system (500) is configured to provide electrical power to the lighting module (200) when
(Continued)

the sacrificial electrode (510) and the second energy system electrode (520) are in electrical contact with the liquid.

15 Claims, 7 Drawing Sheets

(51) Int. Cl.
  *B08B 17/02* (2006.01)
  *B63B 59/08* (2006.01)
  *C02F 1/32* (2006.01)
  *G02B 6/10* (2006.01)
  *B63B 59/06* (2006.01)
(52) U.S. Cl.
  CPC .............. *C02F 1/325* (2013.01); *G02B 6/102* (2013.01); *B63B 59/06* (2013.01)

(56) References Cited

U.S. PATENT DOCUMENTS

| | | | |
|---|---|---|---|
| 2010/0233021 A1* | 9/2010 | Sliwa | A61M 25/0017 422/20 |
| 2013/0048877 A1 | 2/2013 | Thoren et al. | |
| 2014/0078584 A1 | 3/2014 | Farr et al. | |

FOREIGN PATENT DOCUMENTS

| | | | |
|---|---|---|---|
| JP | 2004158209 A | 6/2004 |
| TW | 201422489 A | 6/2014 |
| WO | 2007107722 A1 | 9/2007 |

\* cited by examiner

ANTI-FOULING SYSTEM USING ENERGY HARVESTED FROM SALT WATER

CROSS-REFERENCE TO PRIOR APPLICATIONS

This application is the U.S. National Phase application under 35 U.S.C. § 371 of International Application No. PCT/EP2015/063787, filed on Jun. 19, 2015, which claims the benefit of European Patent Application No. 14175041.4, filed on Jun. 30, 2014. These applications are hereby incorporated by reference herein.

FIELD OF THE INVENTION

The invention relates to an anti-fouling lighting system and to an object, such as a vessel or movable construction for use in especially water, comprising such anti-fouling lighting system. The invention further relates to a method of anti-fouling a fouling surface (of such object). Further, the invention relates to a method of providing an anti-fouling lighting system to an object.

BACKGROUND OF THE INVENTION

Anti-biofouling methods are known in the art. US2013/0048877, for instance, describes a system for anti-bio fouling a protected surface, comprising an ultraviolet light source configured to generate ultraviolet light; and an optical medium disposed proximate to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In WO2007/107722A1 a method of significantly reducing marine fouling is taught, incorporating the use of light in the area around an underwater surface, to detract zoo plankton and salps. These marine organisms are generally nocturnal to avoid optical predators such as fish. As a result they will avoid bright areas. Lights can be provided in fenders around a boat or the like, which can direct light to the area around the underwater surface of the vessel. Alternatively lights could be positioned over the underwater surface. In addition, the underwater surface can be made reflective to increase the light levels around the vessel. In a further alternative, the underwater surface can be coated in a bio- or chemo-luminescent coating.

In JPS5675290A preventive devices against organic adhesion are provided all around a hull near the waterline. Each device is provided with an ultraviolet ray reflection member of a bent plate supported by wires or vertical rods and an ultraviolet radiator like an ultraviolet lamp fixed inside the reflection member via a holding member containing electric wires together with a transparent cover to cover the ultraviolet radiator. It is also provided with a base plate in one body with the ultraviolet ray reflection member, and stuck on a shell plate of the hull via a liner of a permanent magnet, soft rubber, or the like fixed on the base plate. In this construction, the radiation of ultraviolet rays near the waterline prevents the adhesion of bacterial slime on the outer surface of the hull effectively.

SUMMARY OF THE INVENTION

Biofouling or biological fouling (herein also indicated as "fouling") is the accumulation of microorganisms, plants, algae, and/or animals on surfaces. The variety among bio fouling organisms is highly diverse and extends far beyond attachment of barnacles and seaweeds. According to some estimates, over 1700 species comprising over 4000 organisms are responsible for biofouling. Biofouling is divided into microfouling which includes bio film formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and bio film "slime". Together, these organisms form a fouling community.

In several circumstances biofouling creates substantial problems. Machinery stops working, water inlets get clogged, and hulls of ships suffer from increased drag. Hence the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Non-toxic mechanical strategies that prevent organisms from attaching include choosing a material or coating with a slippery surface, or creation of nanoscale surface topologies similar to the skin of sharks and dolphins which only offer poor anchor points. Biofouling on the hull of ships causes a severe increase in drag, and thus increased fuel consumption. It is estimated that an increase of up to 40% in fuel consumption can be attributed to biofouling. As large oil tankers or container transport ships can consume up to € 200,000 a day in fuel, substantial savings are possible with an effective method of anti-bio fouling.

Herewith, an approach is presented based on optical methods, in particular using ultra-violet light (UV). It appears that most micro-organisms are killed, rendered inactive or unable to reproduce with sufficient UV light. This effect is mainly governed by the total dose of UV light. A typical dose to kill 90% of a certain micro-organism is 10 mW-hours per square meter, details are contained in the following paragraphs regarding UV light, and the associated Figures.

One of the issues/challenges is to provide the electrical power to the system that provides the (UV) light or anti-fouling light; since this is on the outside of the object, such as vessel with a (very large) hull, complications may arise, such as:

Drilling holes for the wiring, from the power generator inside the boat, to the system on the outside;
   The length of cables, running from the power source to the actual LEDs;
   Any UV LED system will likely have some form of tiling to cover as much as ~10,000 m$^2$ (or even up to 40,000 for the largest boats around. The interconnections between individual tiles may be difficult to make;

Both a positive and negative electrode are needed, which requires precautions to prevent electrical shorts; especially in salt water, or when damages occur.

Herein, we propose to harvest the required energy directly from e.g. salt water. Salt water, in combination with two different electrode metals, will generate a current. This current can power a load. On a ship, this principle can be cleverly integrated in already existing cathodic protection solutions: a setup with two different materials; the steel hull is accompanied by a so-called sacrificial anode, e.g. made of zinc. Because of the difference in electrochemical potential, the zinc electrode will corrode rapidly; the steel hull at the same time is protected from corrosion. The power generated by this system is not used for any specific purpose though; it is simply wasted. Cathodic Protection (CP) is a technique used to control the corrosion of a metal surface by making it the cathode of an electrochemical cell. A simple method of protection connects protected metal to a more easily corroded "sacrificial metal" to act as the anode. The sacrificial metal then corrodes instead of the protected metal. With such solution, the source of bio fouling on the fouling surface, which may especially be the liquid which is at least temporarily in contact with the surface, may also be used as source of energy to prevent and/or reduce biofouling on the fouling surface.

Hence, it is an aspect of the invention to provide an alternative anti-fouling lighting system and/or an object, such as a vessel, comprising such anti-fouling lighting system and/or a movable construction for use in water comprising such anti-fouling lighting system and/or an alternative method of anti-fouling an element (of such vessel or constructions, etc.), which preferably further at least partly obviate one or more of above-described drawbacks. It is further an aspect of the invention to provide an alternative method of providing an anti-fouling lighting system to an object, such as a vessel, which preferably further at least partly obviate one or more of above-described drawbacks.

In a first aspect, the invention provides an anti-fouling lighting system ("system" or "lighting system") (configured for preventing or reducing (electrically conductive aqueous liquid related, especially electrically conductive water related, even more especially seawater related) biofouling on a fouling surface of an object that during use is at least temporarily exposed to an electrically conductive aqueous liquid by providing an anti-fouling light to said fouling surface, the anti-fouling lighting system) comprising: (a) a lighting module comprising a light source configured to generate an anti-fouling light, and (b) an energy system configured to locally harvest energy and configured to provide electrical power to said light lighting module. In a specific embodiment, the energy system comprises (i) a sacrificial electrode (in electrical connection with a first electrode of the light source), and (ii) a second energy system electrode (in electrical connection with a second electrode of the light source), wherein the energy system is configured to provide electrical power to the lighting module when the sacrificial electrode and the second energy system electrode are in electrical contact with an electrically conductive aqueous liquid, such as especially seawater. In a further embodiment, the energy system may alternatively or additionally also include a photovoltaic cell. Further, in an embodiment the energy system may include a harvesting means such as for example embedded solar cells, small turbines operating in the water, piezoelectric elements operating on pressure waves, etc. Such photovoltaic source or other energy harvesting means may functionally be connected to the first and the second electrode of the light source. The invention is especially further explained in relation to the electrochemical cell. The energy system may generate an electrical power, by which an electrical current may flow through the circuit and power the light source and/or other (option) electric components.

In a further aspect, the invention also provides an object that during use is at least temporarily exposed to an electrically conductive aqueous liquid (such as seawater), the object comprising a fouling surface (that during use is at least temporarily exposed to the electrically conductive aqueous liquid), the object further comprising the anti-fouling lighting system as defined herein, wherein the lighting module is configured to irradiate with the anti-fouling light at least part of said fouling surface. The object may in an embodiment be a vessel comprising a hull. However, the object may also include a movable construction, comprising a movable part, e.g. be a weir, a dam, a sluice, etc., which may have a movable part, such as a door or a valve, etc. Hence, especially the movable construction is an aquatic movable construction. The movable part may comprise an element, like a plate, such as a steel plate. However, other systems than movable constructions are also included (see also below).

With the present lighting system, the object, or at least part thereof, especially the fouling surface, can be kept substantially free of bio fouling. Alternatively or additionally, bio fouling can efficiently be removed. A substantially autonomous system is provided, that does not necessarily need power from inside a body as the lighting system may harvest its own energy. This also allows providing a single autonomous module (herein also indicated as "unit") that can easily be replaced with a new module. Also elements thereof, especially the sacrificial electrode may be exchanged when desired. Hence, energy is saved, the object, such as a hull of a vessel, may be saved, as no through holes are necessary, and fouling may be prevented and/or reduced. Further, as the energy system is a local source, less wiring may be necessary. A further possibility is that due to the fact that the energy system is local (as it is the case of an electrochemical cell as described herein), the light source will only be powered when the energy system, or more especially the sacrificial electrode and the second energy system electrode, are submerged (in the electrically conductive liquid). This effect may be used to let the lighting unit only provide (UV) light when necessary, i.e. when the fouling surface is exposed to (sea)water. Hence, an emission surface of the lighting module and the energy system will in general be at short distances from each other, such as in the range of 0.1-20 m, like 0.2-10 m.

Herein, the term "fouling" or "biofouling" or "biological fouling" are interchangebly used. Above, some examples of fouling are provided. The described method (see below) and lighting system can be applied to prevent fouling on hulls of ships, but they are applicable to all marine objects including stationary (pipes, marine stations etc.) and/or moving marine objects (submarines etc.). The disclosed anti-fouling solution may also be applied to objects operating in waterways, canals or lakes and for example also to aquariums, etc. Biofouling may occur on any surface in water, or close to water and being temporarily exposed to water (or another electrically conductive aqueous liquid). On such surface bio fouling may occur when the element is in, or near water, such as (just) above the water level (like e.g. due to splashing water, such as for instance due to a bow wave). Between the tropics, biofouling may occur within hours.

Even at moderate temperatures, the first (stages of) fouling will occur within hours; as a first (molecular) level of sugars and bacteria.

The surface or area on which fouling may be generated is herein indicated as fouling surface. It may e.g. be the hull of a ship and/or an emission surface of an optical medium (see also below). To this end, the lighting module provides anti-fouling light that is applied to prevent formation of biofouling and/or to remove biofouling. This anti-fouling light especially at least comprises UV radiation (also indicated as "UV light"). Especially, the light source comprises a UV LED configured to provide one or more of UV-A and UV-C light (see also below). UV-A may be used to impair cell walls, whereas UV-C may be used to impair DNA.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In reality many photobiologists often speak of skin effects resulting from UV exposure as the weighted effect of wavelength above and below 320 nm, hence offering an alternative definition.

A strong germicidal effect is provided by the light in the short-wave UVC band. In addition erythema (reddening of the skin) and conjunctivitis (inflammation of the mucous membranes of the eye) can also be caused by this form of light. Because of this, when germicidal UV-light lamps are used, it is important to design systems to exclude UVC leakage and so avoid these effects. In case of immersed light sources, absorption of UV light by water may be strong enough that UVC leaking is no problem for humans above the liquid surface. Hence, in an embodiment the anti-fouling light comprises UV-C light.

Self evidently, people should avoid exposure to UVC. Fortunately this is relatively simple, because it is absorbed by most products, and even standard flat glass absorbs substantially all UVC. Exceptions are e.g. quartz and PTFE (Poly tetrafluor eth(yl)ene). Again fortuitously, UVC is mostly absorbed by dead skin, so erythema can be limited. In addition UVC does not penetrate the eye's lens; nevertheless, conjunctivitis can occur and though temporary, it is extremely painful; the same is true of erythemal effects.

Where exposure to UVC light occurs, care should be taken not to exceed the threshold level norm. In practical terms, Table 1 gives the American Congress of Governmental and Industrial Hygienist's (ACGIH) UV Threshold Limit Effective Irradiance Values for human exposure related to time. At this time it is worth noting that radiation wavelengths below 240 nm forms ozone, $O_3$, from oxygen in air. Ozone is toxic and highly reactive; hence precautions have to be taken to avoid exposure to humans and certain materials.

TABLE 1 permissible UVC exposures for humans according to ACGIH

| Duration of exposure per day | Irradiance ($\mu W/cm^2$) |
|---|---|
| 8 hours | 0.2 |
| 4 hours | 0.4 |
| 2 hours | 0.8 |
| 1 hour | 1.7 |
| 30 minutes | 3.3 |

TABLE 1-continued permissible UVC exposures for humans according to ACGIH

| Duration of exposure per day | Irradiance ($\mu W/cm^2$) |
|---|---|
| 15 minutes | 6.6 |
| 10 minutes | 10 |
| 5 minutes | 20 |
| 1 minute | 100 |

The germicidal doses listed above can also easily be achieved with existing low cost, lower power UV LEDs. LEDs can generally be included in relatively smaller packages and consume less power than other types of light sources. LEDs can be manufactured to emit (UV) light of various desired wavelengths and their operating parameters, most notably the output power, can be controlled to a high degree. Hence, especially the light source is a light source that during operation emits (light source light) at least light at a wavelength selected from the UV wavelength range, especially at least UV-C. In a specific embodiment, the light source comprises a solid state LED light source (such as a LED or laser diode). The term "light source" may also relate to a plurality of light sources, such as 2-20 (solid state) LED light sources, though many more light sources may also be applied. Hence, the term LED may also refer to a plurality of LEDs. The LEDs may be OLEDs or solid state LEDs, or a combination of these LEDs. Especially, the light source comprises solid state LEDs.

In an embodiment, a significant amount of a protected surface to be kept clean from fouling, preferably the entire protected surface, e.g. the hull of a ship, may be covered with a layer that emits germicidal light ("anti-fouling light"), in particular UV light.

In yet another embodiment, the anti-fouling light may be provided to the surface to be protected via a fiber or waveguide. Hence, in an embodiment the anti-fouling lighting system comprises an optical medium, wherein the optical medium comprises one or more of a waveguide and an optical fiber configured to provide said anti-fouling light to the fouling surface. The surface of the fiber or waveguide from which the anti-fouling light escapes is herein also indicated as emission surface. In general, this part of the fiber or waveguide may at least temporarily be submerged. Due to the anti-fouling light escaping from the emission surface, an element of the object that is during use at least temporarily exposed to the liquid (such as seawater), may be irradiated, and thereby anti-fouled. However, the emission surface per se may also be anti-fouled. This effect is used in the embodiments of the lighting module comprising an optical medium described below.

The lighting module for anti-fouling of a protected surface comprises at least one light source for generating anti-fouling light and optionally an optical medium for distributing the anti-fouling light from the light source. The at least one light source and/or the optical medium may be at least partly arranged in, on and/or near the protected surface so as to emit the anti-fouling light in a direction away from the protected surface. The lighting module is adapted to preferably emit the anti-fouling light while the protected surface is at least partially submersed in an liquid environment. In an embodiment, the optical medium is a light guide comprising a silicone material and/or UV grade silica material. Hence, in a specific embodiment, the lighting module further comprises an optical medium configured to receive at least part of the anti-fouling light and configured to distribute at least part of the anti-fouling light through the optical medium, the optical medium comprising (i) a first medium face, and (i) an emission surface configured to emit at least part of the distributed anti-fouling light in a direction away from the first medium face of the optical medium. In such embodiment, the fouling surface may comprises said emission surface. However, alternatively or additionally the anti-fouling light is (also) used to irradiate a surface of the object. Hence, in such instance, the fouling surface may comprise the surface (of an element) of the object, such as the hull of a ship. In a specific embodiment, the light source is embedded in the optical medium, and the optical medium comprises a transit for electrical connections with the light source. The term "transit" may also refer to a plurality of transits. For instance, especially the anti-fouling lighting system, the anti-fouling lighting unit, or the entire anti-fouling lighting system may have a laminar shape. This may allow easy application on a surface of an (element of the) object.

The phrase "wherein the sacrificial electrode is in electrical connection with a first electrode of the light source, and (ii) a second energy system electrode in electrical connection with a second electrode of the light source" and similar phrases do not imply that there is always a closed circuit with the light source switched on. As indicated above, the lighting module may provide anti-fouling light in a pulsed way and its intensity may be varied. Further, the (intensity of the) anti-fouling light may depend upon other (predefined parameters). For instance, a timer (which may also be powered by the energy system) may be used to switch on and off the anti-fouling light. At least during generation of the anti-fouling light, there will be a closed electrical circuit generating an electrical current that flows through the anti-fouling light source(s). Hence, the phrase "by providing an anti-fouling light to said fouling surface" and similar phrases also include embodiments wherein the anti-fouling light is at least temporarily provided to said fouling surface. As indicated above, the invention allows a smart integration of components. This also allows an easy application to the object, such as a vessel, etc., as well as an easy replacement. Hence, the fact that the energy system provides electrical power to the lighting module allows the lighting module to provide the anti-fouling light (at least temporarily). The energy system may also provide power to other electric components, not necessarily comprised by the lighting module.

The lighting module for anti-fouling of a protected surface may also be provided as a foil for applying to the protected surface, the foil comprising at least one light source for generating anti-fouling light and a sheet-like optical medium for distributing the anti-fouling light across the foil. In embodiments the foil has a thickness in an order of magnitude of a couple of millimeters to a few centimeters, such as 0.1-5 cm, like 0.2-2 cm. In embodiments, the foil is not substantially limited in any direction perpendicular to the thickness direction so as to provide substantially large foil having sizes in the order of magnitude of tens or hundreds of square meters. The foil may be substantially size-limited in two orthogonal directions perpendicular to the thickness direction of the foil, so as to provide an anti-fouling tile; in another embodiment the foil is substantially size-limited in only one one direction perpendicular to a thickness direction of the foil, so as to provide an elongated strip of anti-fouling foil. Hence, the optical medium, and even also the lighting module, may be provided as tile or as strip.

The lighting module, whether arranged in, on and/or near the protected surface or whether provided as a separate foil, comprises an emission surface for emitting the anti-fouling light from the optical medium into an environment and a application surface, opposed the emission surface, for applying or arranging the lighting module to the protected surface. In a preferred embodiment the emission surface of the light module is substantially planar so as to avoid pits and indent which may become seeds of fouling and so as to avoid bulges to limit the amount of drag caused by the structure when applied to the protected surface. The advantage of a substantially planar surface versus a surface comprising indents and bulges or having a substantial surface roughness is that it will be more difficult for microorganisms to adhere to a substantially plane surface, especially in combination with drag effects in a liquid environment, than they would onto a rough surface or into pits comprises in said surface. The term 'substantially planar' emission surface herein refers to a surface masking or obscuring the thickness of light sources and wiring connections embed in or attached to the lighting module. The term 'substantially planar' may also refer to masking or obscuring some constructional unevenness of the protected surface, thereby even improving the drag properties of the protected surface in the liquid environment. Example of constructional unevenness of the protected surface are welds, rivets, etc. The term 'substantially planar' can be quantified as resulting in variations in the average thickness of the light modules of less than 25%, preferably less than 10%. 'Substantially planar' therefore not necessarily requires a surface roughness of a machined surface finish.

In a preferred embodiment the lighting module comprises a two-dimensional grid of light sources for generating anti-fouling light and the optical medium is arranged to distribute at least part of the anti-fouling light from the two-dimensional grid of light sources across the optical medium so as to provide a two-dimensional distribution of anti-fouling light exiting the light emitting surface of the light module. The two-dimensional grid of light sources may be arranged in a chickenwire structure, a close-packed structure, a rows/columns structure, or any other suitable regular or irregular structure. The physical distance between neighboring light sources in the grid may be fixed across the grid or may vary, for example as a function of light output power required to provide the anti-fouling effect or as function of the location of the lighting module on the protected surface (e.g location on the hull of a ship). Advantages of providing a two-dimensional grid of light sources include that the anti-fouling light may be generated close to the areas to be protected with anti-fouling light illumination, and that it reduced losses in the optical medium or light guide and that is increasing homogeneity of the light distribution. Preferably, the anti-fouling light is generally homogeneously distributed across the emission surface; this reduces or even prevents under-illuminated areas, where fouling may otherwise take place, while at the same time reducing or preventing energy waste by over-illumination of other areas with more light than needed for anti-fouling.

In preferred embodiments, the light sources are UV LEDs. The at least one UV LED or the grid of UV LEDs may be encapsulated in a liquid-tight encapsulation. In embodiments the at least one UV LED or the grid of UV LEDs may be embedded in the optical medium. A plurality of UV LEDs may be organised in grid and electrically connected in a series/parallel chicken-wire structure (as will be explained later). The LEDs and the chicken-wire connections may be encapsulated in a light-transmissive coating and attached to the optical medium or directly embed in the optical medium. In other embodiments the grid of UV LEDs may be comprised in a layer of electronic textile which is embedded in a resin structure.

In some embodiments the UV LEDs may be packaged LEDs, in which case they already may include an optical element to distribute the light emitted from the LED package across a wide emission angle. In other embodiment the UV LEDs may be LED dies, typically not comprising optical elements but being significantly thinner than packaged LEDs. As an example, LED dies could be picked and placed onto a surface of the optical medium (preferably the application surface, but the emission surface would do as well because of the small size of the components which will nearly not interfering with the light emission function of said surface), electrical wired via printing of conductive paste and finally the LED dies and wiring could be encapsulated with a thin layer/coating of the optical medium or any other backing layer for applying the lighting module to the protected surface. Various embodiments of embedded light sources allow the presented anti-fouling technology to be commercialized as a foil for applying on the hull of ships.

A system for anti-fouling of a protected surface may comprise a plurality of lighting modules as disclosed herein for arranging on the protected surface so as to provide anti-fouling light over substantially the entire area of the protected surface.

Silicone materials can provide optical transmission for UV light with little loss compared to other materials. This is in particular the case for shorter wavelength light, e.g. UV light with wavelengths below 300 nm. A particularly efficient group of silicone materials is, or at least comprises, so-called methyl silicones, according to the general chemical formula $CH_3[Si(CH_3)_2O]_nSi(CH_3)_3$, with "n" indicating any suitable integral, as customary in organic chemistry. This type of silicone materials happens to exhibit excellent UV transmission properties with little losses, at least compared to other silicone materials. Further, silicone materials are flexible and resilient so that they are robust, durable and capable of withstanding compression such as due to bumps, collisions etc of objects against the surface, e.g. bumping of a ship against a quai. Instead of methyl groups also phenyl groups, or phenyl and methyl groups may be present in the silicone.

Further, deformation of a ship's skin due to temperature fluctuation, pounding by waves, ship's flexion over swell and heave etc may be accommodated. Also, silicone materials can be applied and formed over surface structures: welds, rivets, etc. in or on the surface. Silicone materials also tend to adhere well to metals and paints so that a protective coating over the surface is formed. Visibly transparent silicone materials enable reading of underlaying markings (e.g. painted symbols) covered by the silicone material. Further, they are generally water repellent and may reduce friction and drag. On the one hand silicones can be made very smooth to reduce adherence of biofouling organisms to the layer and to reduce friction against flowing water, while on the other hand the material may be finely structured so as to mimic shark's skin which is also known to reduce friction in water at sufficient speed relative to the surrounding water. It is noted that a structured surface of an optical medium, in particular a light guide, can cause breaking conditions for total internal reflection and therewith cause coupling out of light from the light guide that was otherwise captured within and transmitted with total internal reflection. Thus, coupling out of light can be localised reliably.

UV grade silica has very low absorption for UV light and thus is very well suitable as optical medium and light guide material. Relatively large objects may be made from using plural relatively small pieces or portions of UV grade silica together and/or so-called "fused silica", while retaining the UV-transmissive properties also for the larger object. Silica portions embedded in silicone material protect the silica material. In such combination the silica portions may provide UV transparent scatterers in an otherwise silicone material optical medium for (re-)distribution of the light trough the optical medium and/or for facilitating outcoupling of the light from a light guide. Also, silica particles and/or particles of other hard, UV translucent material may fortify the silicone material. In particular flake-shaped silica particles may be used, also in high density, of up to 50%, 70% or even higher percentages of silica in silicone material may provides a strong layer that can resist impacts. It is considered that at least a part of the optical medium or light guide may be provided with a spatially varying density of UV grade silica particles, in particular flakes, at least partly embedded in a silicone material, e.g. to vary optical and/or structural properties. Here, "flakes" denote objects having sizes in three cartesian directions, wherein two of the three sizes may mutually differ, however, each being significantly larger, e.g. a factor 10, 20, or significantly more, e.g. factors of 100's, than the third size.

In embodiments, in parts of the optical medium close to the emission surface for emitting the anti-fouling light from the optical medium, the density of the UV grade silica particles in the silicone material may increase from within the optical medium towards the emission surface of the optical medium, so that at or near the emission surface a relatively high density of silica particles is provided. Although more or less spherical and/or random-shaped particles may be used, silica flakes of sub-millimeter length scales, e.g. with typical sizes down to a few micrometers, may be arranged so close together that under the influence of very local forces, such as a point-impacts from sharp-tipped objects, and/or localised impacts from blunt objects, including scratches, tears etc, the flakes may have some, if only little, freedom of movement in the flexible silicone that they can slightly rearrange themselves, dissipating the impact energy and reducing damage to the light guide as a whole. Thus, a balance of properties can be struck that results in both a robust and a somewhat deformable layer, yet also providing the desired optical qualities. In an embodiment the proportion of silicone material in the optical medium varies gradually from about 100% (i.e. substantially pure silicone material) to below about 5% (mostly silica) from one side of the optical medium to an opposite side.

It is noted that particles, in particular flake-shaped particles, of other material than silica may be used, e.g. glass or mica. Such other materials may also serve as scatterers for the anti-fouling light. Mixtures of particles of different materials may also be provided, which may comprise mixtures of translucent, opaque and/or optically active particles. Compositions of such mixtures may vary across the light guide, e.g. to adjust transmittivity of the light guide for the anti-fouling light, in particular if in some portions relatively large amounts of poorly-transmitting particles are used.

For manufacturing the optical medium, a series of layers of silicone material may be formed, each possibly having a different composition with regard to the amount and/or density of silica particles. The layers may be very thin and at least some may be applied with a wet-on-wet technique, i.e. providing the silicone material to the layer in liquid or gelatinous form that should harden to the desired layer, but wherein a subsequent layer is applied to an earlier layer before the earlier layer has fully hardened. Thus, a good adhesion between the layers is promoted and in the final product different layers may be hardly to not discernible and a gradual change in composition may be achieved. Different layers may suitably be formed and/or applied by spraying of the layer material. A layered material may be formed to any suitable thickness with good quality control. Note that the optical medium, which constitutes a substantial part of the lighting module's surface, may be attached to the protected surface in any suitable way, including gluing. Silicone materials tend to exhibit strong adhesion to ceramic, glassy and metallic materials and spraying or smearing silicone material is therefore a very suitable manner of forming and attaching the optical medium to a substrate. A sprayed and/or smeared optical medium can also readily be made in different desired shapes, e.g. following a water line, specific markings and/or surface shapes. A layering technique may also facilitate orienting particles in the silicone material, e.g. arranging flakes generally parallel to the direction of expansion of the layer and the surface coated with the layer.

In another aspect of the lighting module, the optical medium comprises spaces, e.g. channels which are filled with gas and/or clear liquid, e.g. water, for guiding the light therethrough and an associated method comprises distributing at least part of the light through such spaces in an optical medium. It is found that optical transmission for UV light through gaseous matter, in particular air, is generally significantly better than transmission of the light through a solid material which may, even if found translucent or transparent by some, exhibit absorption losses of up to several percents per millimeter. Clear liquid provides little scattering, may well transport UV light and may also provide structural robustness of cavities in the optical medium compared to filling the spaces with gas. Water, most notably fresh water, has been found to have a relatively high and suitable UV transmittivity. Contamination and/or UV absorption may be also and/or further reduced if distilled, deionised and/or otherwise purified water is used. Hence, it is considered particularly beneficial to transmit the light through a gas- and/or liquid-filled space.

For distribution of the light across the protected surface, the gas- and/or liquid-filled space should preferably be well defined and channels may be provided in a optical medium. Light that eventually strikes walls of the channels can enter the optical medium and be emitted from the optical medium in a direction from the protected surface and into the liquid environment to provide the anti-fouling light. An optical medium in which the air channels are defined that is itself well transparent to the anti-fouling light further assures that if the optical medium would leak and the liquid medium enters the optical medium, generated anti-fouling light would still be appropriately transmitted through the optical medium. Channels may comprise varying diameter. Localised channel portions or pockets may be provided by wall portions defining and encapsulating separate volumes (much) bigger than the respective wall portions' sizes and/or thicknesses, e.g. similar to the packaging product sold under the brand name "Bubble Wrap".

In a particular embodiment, such gas-containing optical medium comprises a silicone material defining the gas and/or liquid-filled channels and/or other spaces; silicone materials may well be shaped to define intricate structures. Further advantages of silicone materials, with or without additional objects such as silica particles have been set out above.

In an embodiment, the channels and/or other spaces are provided by forming two opposing layers of silicone material kept separated at desired distances with wall portions and/or pillars of silicone material creating a distance, e.g. an air gap between the layers. Such wall portions and/or pillars may serve as scattering centres for (re-)distributing the light through (the channels in) the optical medium and/or for guiding light from the gas- and/or liquid filled space(s) into the silicone material. This facilitates localising emission of the light from the optical medium into the liquid environment where the anti-fouling light is to be put to use.

At least part of the anti-fouling light emitted by the one or more light sources may be spread in a direction having a component substantially parallel to the protected surface, or substantially parallel to the application surface of the foil when the light moduled is provided as a foil. This facilitates distributing the light over significant distances along the protected surface, or the application surface of the foil, which assists in obtaining a suitable intensity distribution of the anti-fouling light.

A wavelength conversion material may be comprised in the optical medium and at least part of the anti-fouling light may be generated by photo-exciting the wavelength conversion material with light having a first wavelength causing the wavelength conversion material to emit the anti-fouling light at another wavelength. The wavelength conversion material may be provided as an upconversion phosphor, quantum dots, nonlinear media such as one or more photonic crystal fibers etc. Since absorption and/or scattering losses in the optical medium for light of different, mostly longer, wavelengths than UV light tend to be less pronounced in optical media, it may be more energy-efficient to generate non-UV light and transmit that through the optical medium and to generate UV anti-fouling light at or near the desired location of use thereof (i.e. emission form the surface into the liquid environment). Suitable anti-fouling light is in the wavelength range of UV or optionally also blue light, from about 220 nm to about 420 nm, in particular at wavelengths shorter than about 300 nm, e.g. from about 240 nm to about 280 nm.

When a wavelength conversion material is applied, the phrase "a light source configured to generate an anti-fouling light" may be interpreted as a light source for generating in combination with a wavelength conversion material an anti-fouling light. Either the light source itself, or the wavelength conversion material upon conversion of the light source light into wavelength conversion material light, or both, provide said anti-fouling light.

In embodiments, the optical medium comprises a light spreader arranged in front of the at least one light source for generating anti-fouling light for spreading at least part of the anti-fouling light emitted by the at least one light source in a direction having a component substantially parallel to the protected surface. An example of a light spreader may be a 'opposite' cone arranged in the optical medium and position opposite the at least one light source, where the opposite cone has a surface area with a 45° angle perpendicular to the protected surface for reflecting light emitted by the light source perpendicular to said surface in an a direction substantially parallel to said surface. In embodiments the optical medium comprises a light guide arranged in front of the at least one light source for generating the anti-fouling light, the light guide having a light coupling-in surface for coupling in the anti-fouling light from the at least one light source and a light coupling-out surface for coupling-out the anti-fouling light in a direction away from the protected surface; the light guide comprising a light guide material having a refractive index higher than the refractive index of the liquid environment such that at least part of the anti-fouling light is propagated through the light guide via total internal reflection in a direction substantially parallel to the protected surface before being out-coupled at the out-coupling surface. Some embodiment may comprise an optical medium which combines a light spreader and a light guide, or integrated light spreading features with light guiding features into the optical medium. In embodiments, the light spreader and/or light guide is coated onto the protected surface. In other embodiments, the light spreader and/or light guide is provided in the form factor of a foil for applying onto a protected surface.

An embodiment of a system for preventing fouling may comprise:
- a series of UV LEDs for generating anti-fouling light;
- a light spreader for spreading the anti-fouling light from the LED point sources across the protected surface; and
- a light guide (or waveguide) for further guiding/spreading the anti-fouling light can be spread across the surface, the light guide comprising a tin layer of silicone material transparent to UV light, with or without silica particles or one or more silica covered portions.

When substantially the entire protected surface is covered with an anti-fouling light emitting optical medium, it substantially reduces the growth of micro-organisms on this medium. As the micro-organisms are killed on the emission surface of the optical medium, the hull is continuously cleaned through the water flow along the hull which transports the debris away from the ship and micro-organisms do not stand a chance of fouling on the hull.

It is an advantage of the presently provided solutions that the micro-organisms are not killed after having adhered and rooted on the fouling surface, as is the case for known poison dispersing coatings, but that the rooting of micro-organisms on the fouling surface is prevented. It is more efficient to actively kill micro-organism right before or just after they contact the fouling surface, compared to a light treatment to remove existing fouling with large micro-organism structures. The effect may be similar to the effect created by using nano-surfaces that are that smooth that micro-organism cannot adhere to it.

Because the low amount of light energy required for killing the micro-organism in the initial rooting stage, the system may be operated to continuously provide an anti-fouling light across a large surface without extreme power requirements.

A grid of LEDs creating a lighting surface may be provided with energy harvesting means such as for example embedded solar cells, small turbines operating in the water, piezoelectric elements operating on pressure waves, etc.

Some advantages of the presently provided technology include the retention of clean surface, Reduction of the cost of corrosion treatment, reduced fuel consumption for ships, reduced maintenance time for hulls, educed $CO_2$ emission, reduce the use of toxic substances in the environment, etc. A substantially planar and smooth light emission surface further has the advantage of not adding drag by itself and can even further reducing drag by burying existing unevenness (rivets, welds, etc.) of the protected surface underneath the optical medium.

The object (see also below) may comprise one or more elements that are at least temporarily exposed to the liquid. Such element may include a first element surface, which may at least temporarily be exposed to the liquid. Such element may also comprise a second element surface, which may be directed to the body of the object.

Instead or in addition to silicone, as material for the optical medium, one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polyvinylchloride (PVC), polyethylene terephthalate (PET), (PETG) (glycol modified polyethylene terephthalate), PDMS (polydimethylsiloxane), and COC (cyclo olefin copolymer) may be applied. Especially, the optical medium is not stiff. For instance, the optical medium may be applied to a hull of a ship. However, the optical medium may also be constructed on the hull of a ship by coating material to the hull and thereby forming the optical medium.

The optical medium is configured to receive at least part of the anti-fouling light of the light source. Hence, especially the light source and the optical medium are radiationally coupled. The term "radiationally coupled" especially means that the light source and the optical medium are associated with each other such that at least part of the radiation emitted by the light source is received by the optical medium. The optical medium is configured to distribute the anti-fouling light through the optical medium. This may be due to the fact that the optical medium especially has lightguiding (of waveguiding) properties. Optionally, the light source is embedded in the optical medium (see also below).

Further, the optical medium may also include outcoupling structures to couple the anti-fouling light out. Hence, anti-fouling light that may be captured within the optical medium by total internal reflection may escape due to outcoupling via an outcoupling structure. These outcoupling structures may be embedded in the optical medium and/or may be configured at a surface of the optical medium. Especially, the outcoupling structures, optionally in combination with a reflector at at least part of the first medium face, are configured to facilitate emission of the anti-fouling light from the emission surface, in a direction away from the first medium face (i.e. during use of the lighting module: away from the first element surface of the element (see also below)). This light is used to prevent biofouling and/or remove biofouling at the emission surface of the lighting module.

As indicated above and below, the lighting module may essentially consist of the optical medium. For instance, one or more of a control system and a power supply may (also) be embedded in the optical medium. Further, as a single LED may provide anti-fouling light through a large area of the optical medium, in an embodiment the surface area of the lighting module may consist for at least 80% of the optical medium. The optical medium may be used to seal the element. Hence, the first medium face may have a surface area substantially equal to the surface area of the first element surface. Especially, the first medium face is in physical contact with the first element surface. Even more especially, the entire first medium face is in physical contact with the first element surface. The phrase "with the emission surface configured more remote from the first element surface than the first medium face", indicates that the first medium face of the optical medium is closer to the first element surface of the element than the emission surface. In this way, anti-fouling light may escape in in a direction away from the element. As indicated above, in some embodiment at least part of the first medium face, or especially the entire first medium face, may be in physical contact with the (first element surface of the) element. The term "seal" and similar terms may especially indicate that the part that is sealed is (substantially) not accessible to a liquid, such as water, especially seawater.

More than one lighting module may be applied to an object, such as a single element of such object. Hence, the term "lighting module" may also refer to a plurality of lighting modules. Further, a single lighting system may include a plurality of optical mediums. Hence, the term "optical medium" may also refer to a plurality of optical mediums. Of course, the anti-fouling lighting system may also include a plurality of elements. Hence, as indicated above, the term "element" may also refer to a plurality of lighting elements. The term "element" may e.g. in an embodiment refer to a plate, such as a steel plate, of the hull. However, the term "element" may also refer to the entire hull. The term "element" especially refers to the part of the hull that is at the water side, especially in case of vessel embodiments.

In an embodiment, the lighting module may comprise said control system and optionally also a power supply. In this way, a system may be provided at the first element surface of the element, without the necessity to include through holes through the element. This may be beneficial, amongst others in view of protection of the element. Further, the power supply may optionally include a local energy harvesting system as described herein, such as a system that generates electrical energy from water, especially an electrically conductive aqueous liquid, such as especially seawater, and/or a photovoltaic system. Both may advantageously be arranged at such element, with the former especially below the (expected) water level and the latter especially above the (expected) water level.

Herein, the invention is described with respect to an electrically conductive aqueous liquid. However, the invention may also be relevant for an electrically conductive non-aqueous liquid. Such (aqueous or non-aqueous) liquids are especially conductive, due to the presence of ions, such as in the case of seawater. Hence, especially the electrically conductive aqueous liquid comprises seawater.

In embodiment the anti-fouling lighting system also comprises a control system. Especially, the control system is configured to control an intensity of the anti-fouling light as function of one or more of a feedback and a timer. The term control system may refer to an electronic circuit, such as a sensor in a circuit that after reaching a threshold level allows or induces another action, such as switching on or off the light, and/or may refer to a control unit which may include (programmable) software. In an embodiment, the control system includes a (linear) feed back system. The control system may thus be configured to steer the lighting module (especially its anti-fouling light). The term "to control an intensity" may refer to on/off status of the anti-fouling light but may alternatively or additionally also refer to high and low intensity of the anti-fouling light. It may also refer to a stepwise of stepless increase or decrease of the anti-fouling light between a maximum and a minimum (such as no intensity).

The timer may e.g. be a system that triggers the lighting module to provide light during a certain period and to be switched off during another period. Hence, in an embodiment the lighting system is configured to provide anti-fouling light in a pulsed way wherein periods with anti-fouling light are alternated with periods without anti-fouling light. The light pulses may include one or more of block (square) pulses, triangular pulses, sawtooth pulses, unipolar sinus like pulses (like e.g. with rectification), etc. The frequency may range from seconds to hours, or even days. Optionally, the pulsed light may include a slow and a fast pulse, e.g. 3 hours on and 3 hours off, wherein during the on-time, pulsed light is provided with a frequency in the range of 0.001-200 Hz, such as 0.01-20 Hz. By using pulsed light, especially with a relative low frequency, such as <0.01 Hz, biofouling may be formed in the dark periods, and during the on-period, the biofouling may efficiently be removed. In this way, less light may be wasted. Hence, in a specific embodiment, the anti-fouling lighting system may be configured to provide the anti-fouling light in a pulsed way wherein periods with anti-fouling light are alternated with periods without anti-fouling light. To this end, e.g. a control system in combination with a timer may be applied, to provide anti-fouling light in a pulsed way.

The lighting system may also include a sensor. The term "sensor" may also relate to a plurality of sensors. A typical embodiment for the anti-fouling lighting system could especially include the following:
  Sensors for one or more of the parameters (see below);
  Software to calculate the required amount of power, based on the parameter values and knowledge (e.g. predefined settings) of minimum power settings to prevent fouling;
  A control unit to adjust the effective output power; as a whole, or per section of e.g. the hull or another element.

In a specific embodiment, the control system is configured to control the intensity of the anti-fouling light as function of the feedback of a sensor, wherein the sensor is configured to sense one or more of (i) a velocity of a vessel comprising said lighting module, (ii) a relative velocity of flow of water (at a side of the fouling surface), (iii) a water temperature of water (at a side of the fouling surface), (iv) a loading of a vessel comprising said lighting module, (v) a position of the emission surface relative to a electrically conductive aqueous liquid level of the electrically conductive aqueous liquid (at a side of the fouling surface). The electrically conductive aqueous liquid level may especially be a water level, even more especially a seawater level.

Above, some aspects of the system are described, including integration options. In a further specific embodiment, the anti-fouling lighting system comprises an integrated unit, the integrated unit comprising (i) the lighting module and one or more of said sacrificial electrode and said second energy system electrode and optionally one or more of a control system, (a timer) and a sensor, wherein the control system is configured to control an intensity of the anti-fouling light as function of one or more of (i) a feedback signal from the sensor related to a biofouling risk and (ii) a timer for (periodically) varying the intensity of the anti-fouling light. In yet a further embodiment, the anti-fouling lighting system comprises an integrated unit, the integrated unit comprising (i) the lighting module and (a) one or more of a control system, a timer, and a sensor, wherein the control system is configured to control an intensity of the anti-fouling light as function of one or more of (i) a feedback signal from the sensor related to a biofouling risk and (ii) a timer for (periodically) varying the intensity of the anti-fouling light, and optionally (b) one or more of said sacrificial electrode and said second energy system electrode. Such units can conveniently be attached to an existing surface of an object to prevent or reduce fouling, and may also take account of existing infrastructure, such as an infrastructure for sacrificial electrodes. When the sacrificial electrode is included in the integrated unit, the sacrificial electrode is especially configured detachable, such as with snap-on/snap-off means or screws, etc. This allows replacement after e.g. substantial use of the sacrificial electrode.

Further, when one or more of the sacrificial electrode and said second energy system electrode are intergrated in the unit, at least part of these electrodes are accessible from the external of the unit. In this way the liquid and the sacrificial electrode and said second energy system electrode can come into contact, such that the electric circuit may be formed. Hence, though e.g. all components may be embedded in a silicon optical medium or other optical medium, the sacrificial electrode and/or said second energy system electrode when also integrated in the unit, are accessible by the electrically conductive aqueous liquid (whereas other electrical components will in general not be accessible to this liquid, and may be fully embedded in the lighting module, especially the optical medium. When both the sacrificial electrode and said second energy system electrode are integrated in the unit, it is e.g. not necessary to use the steel of a hull of ship. Hence, the surface of an (element of the) object to be protected may comprise steel, but may optionally also comprise another material, such as e.g. selected from the group consisting of wood, polyester, composite, aluminum, rubber, hypalon, PVC, glass fiber, etc. Hence, instead of a steel hull, the hull may also be a PVC hull or a polyester hull, etc. Instead of steel, also another iron material, such as an (other) iron alloys.

Especially, the integrated unit is a closed unit, including the emissive surface, wherein only one or more of a first electrode of the light source, a second electrode of the light source, the sacrificial electrode and the second energy system electrode, have access to the exterior (and can be exposed to the liquid).

The integrated unit may e.g. a (silicone) foil or a (silicone) tile, that may be applied to the surface of an (element of the) object. All elements may be embedded therein, with the second energy system electrode and sacrificial electrode available for contact with the liquid, especially seawater.

Optionally, a sensor may also be configured to monitor the sacrificial electrode, with especially the control system giving a warning signal after a predetermined value indicative of the status of the sacrificial electrode.

The light source, especially a solid state light source, may comprise a first electrode and a second electrode (see also above). The latter may e.g. be in contact with a ground. For instance, the latter may be in contact with a steel hull of a vessel or other object. This may be via a second energy system electrode; e.g. the steel hull or other steel surface may have the function of the second energy system electrode. The former, i.e. the first electrode of the light source may especially be in contact with a sacrificial electrode. Further, this sacrificial electrode and the second energy system electrode may especially be in contact with a water comprising ions, i.e. an electrically conductive liquid, such as an electrically conductive aqueous liquid, such as especially seawater. In this way, there is a circuit, with a potential difference between the sacrificial electrode and the second energy system electrode, and thus between the first electrode and the second electrode. Hence, especially the sacrificial electrode and the second energy system electrode comprise different materials.

In a specific embodiment, the sacrificial electrode comprises one or more of zinc and magnesium. In a further embodiment, the second energy system electrode comprises steel iron, such as steel. However, other materials may also be applied, like especially one or more of carbon, graphite, coke, platinum, mill scale on steel, high silicon cast iron, copper, brass, bronze, lead, and cast iron (not graphitized), instead of or in addition to e.g. steel. The phrase "wherein the sacrificial electrode comprises one or more of zinc and magnesium" may also refer to sacrificial electrodes comprising an alloy comprising zinc and/or magnesium. However, the sacrificial electrode may also substantially consist of zinc and/or magnesium. Other materials may also be applied, such as some sorts of aluminum or aluminum alloys. Especially, the lighting system, especially the energy system, may further comprise a voltage difference enhancer configured to increase a voltage difference between the first electrode and a second electrode of the light source. For instance, a "joule thieve" may be applied. Joule thieves and devices having similar properties, such as a boost converter, may be applied to increase the potential difference obtainable with the energy system, which may be somewhat low for e.g. solid state light sources. Especially, the sacrificial electrode and the second energy system electrode comprise materials that when in contact with seawater, or an other electrically conductive liquid, provides a potential difference of at least 0.25 V, even more especially at least 0.35 V between these electrodes. In combination with the voltage difference enhancer, a potential difference between the first electrode and the second electrode can be created useful for e.g. a (UV) solid state light source. The terms "sacrificial electrode" and "second energy system electrode" may independently also refer to a plurality of sacrificial electrodes and second energy system electrodes, respectively. The phrase "are in electrical contact with the electrically conductive aqueous liquid" especially indicates that the electrodes are in physical contact with the liquid. Then a closed circuit may be formed, allowing the energy system providing power to the lighting module, especially the light source. The energy system may also provide power to other (optional) elements, like a sensor, a control system, a timer, etc. Hence, in an embodiment one or more of the control system and the sensor (and optional other electric components, such as optionally a timer, etc.) are also powered by the energy system. For instance, the lighting module may be configured to vary the intensity of the anti-fouling light. To this end, the lighting module may include electrical components, such as a control system, to (periodically) vary the anti-fouling light intensity. Hence, the voltage difference enhancer may be applied to increase the voltage difference also to other electric components of the lighting system, especially the lighting module, such as an optional control system. Hence, in an embodiment The anti-fouling lighting system according to any one of the preceding claims, the anti-fouling lighting system further comprises a voltage difference enhancer configured to increase a voltage difference of the electrical power provided to the lighting module. The current provided may be lower, but the voltage difference may be enough to power the light source and/or other optional electric components of the lighting system.

As indicated above, the invention also provides an object (that, especially during use is at least temporarily exposed to an electrically conductive aqueous liquid) comprising a fouling surface (that during use is at least temporarily exposed to the electrically conductive aqueous liquid), the object further comprising the anti-fouling lighting system as described herein, wherein the lighting module is configured to irradiate (during use of the object) with the anti-fouling light at least part of said fouling surface. Irradiation may be done directly with the light source, or e.g. via a fiber or via a waveguide, such as the herein described optical medium. As indicated above, the object may e.g. a vessel, a stew, a sluice, a fish farming sea cage, and other movable or fixed marine objects, etc. In a specific embodiment, the object comprises a vessel, wherein the vessel comprises a steel hull, and wherein the hull is configured as second energy system electrode. The fouling surface may be a part of the surface of (an element of) the object and/or may be the emissive surface of the lighting system (especially of the optical medium, when comprised by the lighting system; see also below). Hence, in embodiments the object is selected from the group consisting of a vessel, a weir, a dam, a stew, a sluice, a fish farming sea cage, and a buoy.

As indicated above, the lighting module may further comprise an optical medium configured to receive at least part of the anti-fouling light and configured to distribute at least part of the anti-fouling light through the optical medium, the optical medium comprising (ia) a first medium face, and (ib) an emission surface configured to emit at least part of the distributed anti-fouling light in a direction away from the first medium face of the optical medium. Especially, the first medium face is in physical contact with the first element surface.

In yet a further embodiment, the object comprises a plurality of lighting modules arranged over at least part of a height of the object, wherein the control system is configured to control an intensity of the anti-fouling light as function of a position of the lighting module relative to a electrically conductive aqueous liquid level of the electrically conductive aqueous liquid at a side of the fouling surface. Especially, the height of the object is defined as the height of the object in use, in e.g. water, from the lowest point below the liquid level to the highest point of the object. Height of elements of such object are defined with the height defined relative to a vertical direction from the lowest point to the highest point. For instance, the height of a hull may be the height from the keel to the e.g. the railing. Advantageously, undesired anti-fouling light above the water level may be reduced (and waste of light and energy may be reduced), whereas below the water level the anti-fouling light may be provided. This also enhances (human (and/or animal) safety, as exposure from e.g. human beings to UV radiation is desirably as low as possible. Hence, the control system may be configured to control an intensity of the anti-fouling light as function of a position of the lighting module relative to the depth of the lighting module below the electrically conductive aqueous liquid level of the electrically conductive aqueous liquid (at a side of the fouling surface).

In yet a further embodiment, the invention also provides an anti-fouling lighting system (configured for preventing or reducing biofouling on a fouling surface of an object that during use is at least temporarily exposed to an electrically conductive aqueous liquid, by providing an anti-fouling light to said fouling surface, the anti-fouling lighting system) comprising: (a) a lighting module comprising a light source configured to generate an anti-fouling light; and (b) an energy system configured to locally harvest energy and configured to provide electrical power to said light lighting module, wherein the energy system comprises (a) a sacrificial electrode in electrical connection with a first electrode of the light source, and/or a (first) electrical connection for connecting with such sacrificial electrode, the (first) electrical connection in electrical connection with the first electrode of the light source, and (ii) a second energy system electrode in electrical connection with a second electrode of the light source and/or a (second) electrical connection for connecting with such second energy system electrode, the (second) electrical connection in electrical connection with the second electrode of the light source; wherein the energy system is configured to provide electrical power to the lighting module when the sacrificial electrode and the second energy system electrode are in electrical contact with the electrically conductive aqueous liquid. One or more of the sacrificial electrode and the second energy system electrode may already available in an existing structure. Hence, in this way the anti-fouling lighting unit may be applied to the existing infrastructure, for instance already including a sacrificial electrode.

In yet a further aspect, the invention also provides a method of anti-fouling a fouling surface of an object that is during use at least temporarily exposed to an electrically conductive aqueous liquid, the method comprising: (a) providing a lighting module as defined herein; (b) generating the anti-fouling light, optionally as function of one or more of (i) a feedback signal related to biofouling risk and (ii) a timer for (periodically) varying the intensity of the anti-fouling light; and (c) providing said anti-fouling light to said fouling surface. In this way, during use of an object, such as during shipping and/or during stay in a harbour, a vessel may be kept clean from biofouling, or biofouling may be removed. The same applies to other objects, that may be anti-fouled with this method. The phrase "method of anti-fouling" indicates that fouling is prevented and/or fouling may be removed. Hence, the method may be curative and/or preventive. The method may especially further comprise controlling the intensity of the anti-fouling light as function of the feedback of a sensor, such as amongst others defined above. For instance, one may imagine a 3 hours off, 5 minutes on scheme. In an embodiment, the anti-fouling light is provided 0.2-10 minutes every hour. In yet another embodiment, the anti-fouling light is provided 30-300 minutes every (natural) day, i.e. every 24 hours. The on-time and/or the off-time may be variable, e.g. based on a feedback signal. Especially, the anti-fouling light will be generated when the object is at least partly exposed to the electrically conductive aqueous liquid, as will in general be the case when the object is used (according to its predetermined use). Hence, the anti-fouling lighting system may be configured to provide, during use of the anti-fouling lighting system, anti-fouling light with a variable intensity, optionally including on and off periods of the anti-fouling light. To this end, the anti-fouling lighting system, especially the module, may include further electric components, such as a timer and/or a control system.

In yet a further aspect, the invention provides a method of providing an anti-fouling lighting system to an object, that during use is at least temporarily exposed to an electrically conductive aqueous liquid, the method comprising providing a lighting module (and an energy system) as defined herein to the vessel, with the lighting module configured to provide (during use) said anti-fouling light to a fouling surface of one or more of the object and the lighting module attached to the object. Hence, the anti-fouling lighting system (and the energy system) may also be applied to existing objects. For instance, the anti-fouling lighting system may be integrated in an existing infrastructure for sacrificial electrodes. When the energy system and the lighting module are functionally coupled, the anti-fouling lighting system is provided to the object. With the anti-fouling method and with the method of providing an anti-fouling lighting system to an object, the fouling surface can be protected. As indicated above, the fouling surface may especially comprises one or more of the emissive surface of the optical medium and a first element surface of an element comprised by a hull of said vessel. Hence, when applying the anti-fouling lighting system to the object, one or more elements of the energy system may already be available at the (existing) object.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1:
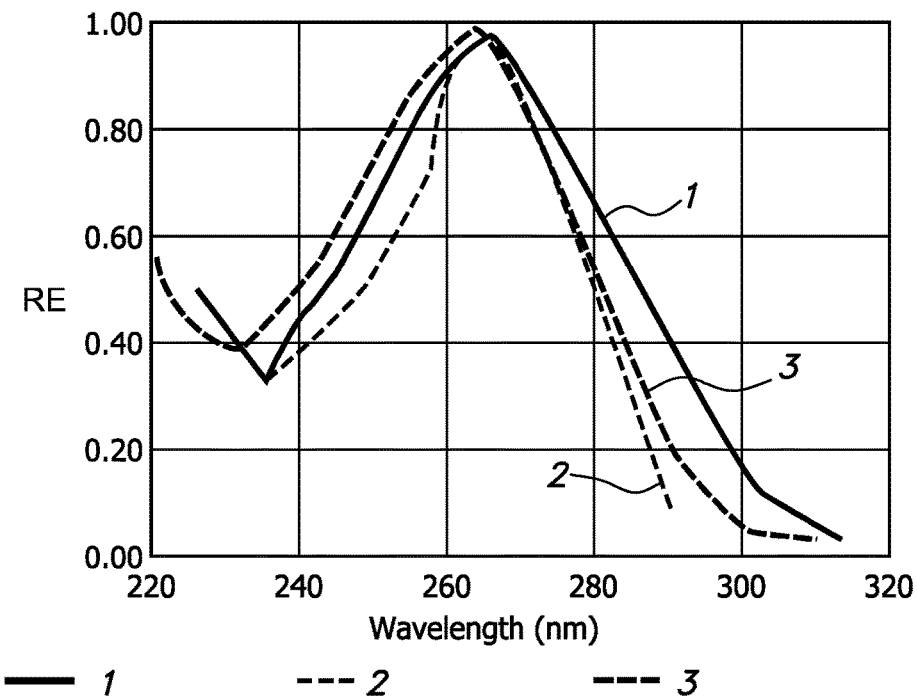
FIG. 1 is a graph showing a germicidal action spectrum for different biological materials as a function of light wavelength.

The drawings are not necessarily on scale.

DETAILED DESCRIPTION OF THE EMBODIMENTS

While the disclosure has been illustrated and described in detail in the drawings and foregoing description, such illustration and description are to be considered illustrative or exemplary and not restrictive; the disclosure is not limited to the disclosed embodiments.

FIG. 1 is a graph showing a germicidal action spectrum for different biological materials as a function of light wavelength, with RE indicating the relative effectiveness, with curve 1 indicating the germicidal action as derived from the IES Lighting Handbook, Application Volume, 1987, 14-19; curve 2 indicating *E. Coli* light absorption (as derived from W. Harm, Biological Effects of ultraviolet radiation, Cambridge University Press, 1980), and curve 3 indicating DNA absorption (as also derived from the IES handbook).

Figure 2:
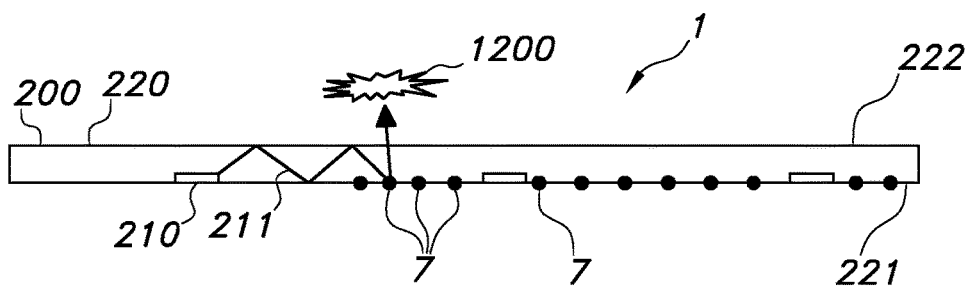
FIG. 2 is a schematic cross section view of a light module with a light guide.

FIG. 2 shows as a basic embodiment a cross section of a lighting module 200 comprising a plurality of light sources 210 (here: side-emitting LEDs, wherein the light is emitted primarily from the side of the LED, and more or less parallel to the surface) encapsulated in a liquid-tight optical medium 220 to guide at least part of the light 211 emitted from the light sources 210 via total internal reflection through the optical medium, which optical medium is further provided with optical structures 7 to scatter light 211 and guided the light 211 out of the optical medium 220 towards an object 1200 to be targeted with the light (a biofouling organism). The optical medium 220 generally extends in two dimensions significantly further than in the third dimension so that a two-dimensional-like object is provided. Optical structures 7 to scatter light 211 may be spread in one or more portions of the optical medium material, possibly throughout all of it, wherein in such portions the distribution may be generally homogeneous or localised. Scattering centres with different structural properties may be combined to provide, besides optical, also structural characteristics, such as resistance to wear and/or impact. Suitable scatterers comprise opaque objects but largely translucent objects may be used as well, e.g. small air bubbles, glass and/or silica; a requirement is merely that a change in refractive index occurs for the wavelength(s) used.

The principle of light guiding and spreading light over a surface is well-known and widely applied in various fields. Here, the principle is applied to UV light for the purpose of anti-fouling. It is noted that the idea of making a surface, e.g. the hull of a ship self-lit with UV is a clearly different solution than the current and well established anti-fouling solutions which rely on smooth coatings, chemicals, cleaning, software to control the ship speed, etc.

Total internal reflection is one way of transmitting light through an optical medium, which is then often referred to as a light guide. To maintain the conditions for total internal reflection, the index of refraction of the light guide should be higher than that of the surrounding medium. However, the use of (partly) reflecting coatings on the light guide and/or use of the reflective properties of the protected surface, e.g. the hull of a ship, itself can also be used to establish the conditions for guiding the light through the optical medium.

In some embodiments the optical medium may be positioned relative to the protected surface, e.g. the hull of a ship, such that a small air gap is introduced between the optical medium and the protected surface; UV light may travel even better—with less absorption—in air than in an optical medium, even when this optical medium is designed as a light guiding material. In other embodiments gas-filled channels, e.g. air channels, may be formed within silicone material. An array of separate gas-filled pockets may also be provided, e.g. in a regular pattern like a rectangular or honeycomb-pattern or in an irregular pattern. Instead of gas (e.g. air) filling, channels and/or pockets may be at least partly filled with a UV-transmissive liquid, e.g. fresh and/or purified water. In case a protected surface that is covered with such optical medium is subject to impact, e.g. a ship hitting a dockside, small pockets may soften, redistribute the impact energy and hence protect the surface, wherein liquid-filled pockets may be robuster under deformation than air-pockets which may more easily burst open.

As most materials have a (very) limited transmittance for UV light, care has to be taken in the design of the optical medium. A number of specific features and/or embodiments, which are dedicated for this purpose are listed in the following:

- A relatively fine pitch of low power LEDs can be chosen, to minimize the distance light has to travel through the optical medium.
- A 'hollow' structure can be used, e.g. a silicone rubber mat with spacers that keep it a small distance away from the protected surface. This creates air 'channels', through which the UV light can propagate with high efficiency (air is very transparent for UV). Use of gas filled channels provided by such structures allows distributing the UV light over significant distances in a optical medium of material that would otherwise absorb the UV light too strongly to be useful for anti-fouling. Similarly, separate pockets may be formed.
- A special material can be chosen with high UV transparency, like certain silicones or UV grade (fused) silica. In embodiments, this special material can be used only for creating channels for the light to propagate the majority of the distance; a cheaper/more sturdy material can be used for the rest of the surface.

Further embodiments are disclosed in the accompanying drawings, wherein a main issue is to illuminate a large surface with anti-fouling light, preferably UV light, yet using point light sources. A typical concern is spreading of the light from point sources to surface illumination. In more detail:

- The protected surface area of a typical container ship is ~10,000 m².
- A typical LED source has an area of ~1 mm². This is $10^{10}$ smaller.
- Taking the required power levels into account, about 10 LEDs per m² may be required
- This means light has to be spread from 1 LED over ~1000 cm²
- As another boundary condition is taken that the solution should be thin (order of magnitude: 1 cm), e.g. for reasons such as:
  - To be able to add the solution as a 'coating' to a ship
  - To not increase drag due to an increased cross section size of the ship
  - To keep (bulk) material costs limited.

The use of an optical medium, in particular a generally planar light guide is therefore provided. Typical dimensions of a light guide are a thickness of about 1 mm to about 10 mm. In the other directions, there is no real limit to the size, from an optical point of view; in particular not if plural light sources are provided so that decay of light intensity throughout the light guide due to partial outcoupling of light and possibly (absorption) losses are countered.

Here, it is considered that similar optical challenges apply as with the design of LCD TV backlights, although emission light intensity uniformity is less stringent in anti-fouling than with LCD TV backlights.

Additional ideas and solutions exist to obtain a better uniformity in a thinner optical structure, such as introduction of scatters and/or reflectors or other light spreaders directly in front of one or more light sources.

Figure 3:
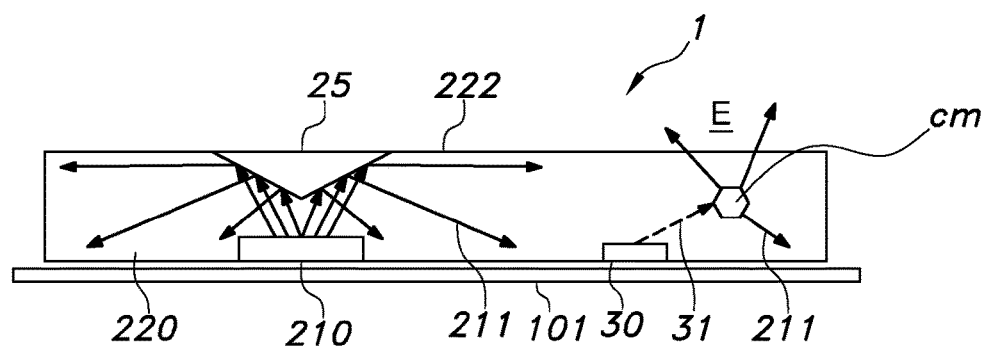
FIG. 3 shows an embodiment comprising a redistribution reflector and a wavelength conversion material.

FIG. 3 shows (left hand side) inclusion of a light spreader in the form of a reflective cone 25 in the optical medium 220 with an apex towards the light source 210. This directs the light 211 in a direction having a component substantially parallel to the surface 101 to be protected against fouling. If the cone 25 is not fully reflective nor opaque, some light from the light source will pass through it and creation of shadows leading to reduced or ineffective anti-fouling is prevented.

Further, FIG. 3 shows a wavelength conversion material CM which is comprised in the optical medium 220. The illustrated embodiment is configured to generate at least part of the anti-fouling light by photo-exciting the wavelength conversion material CM with light from a light source 2100 with light 31 having a first wavelength causing the wavelength conversion material to emit anti-fouling light 211 at another wavelength from the optical medium 220 into the environment E, i.e. downstream from the emission surface 222. The distribution of wavelength conversion material in optical medium 220 may be spatially varying, e.g. in accordance with (expected) intensity distributions of (different wavelengths of) light in the optical medium 220.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

Figure 4A:
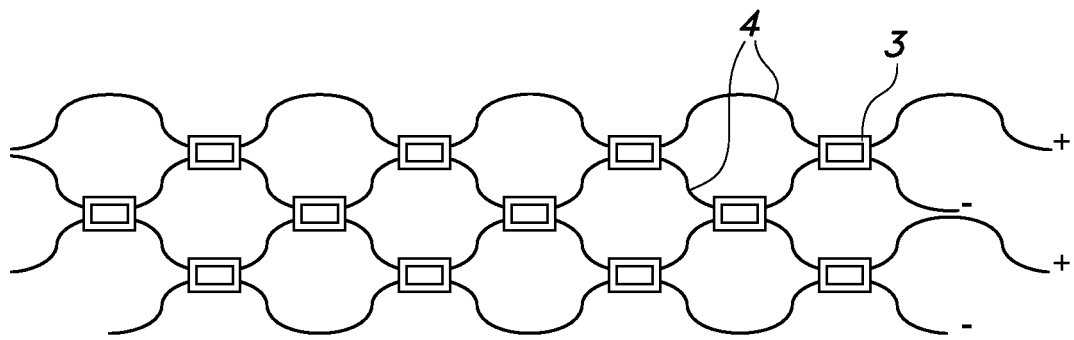
FIGS. 4a-c show embodiments of a chicken-wire grid.
Figure 4B:
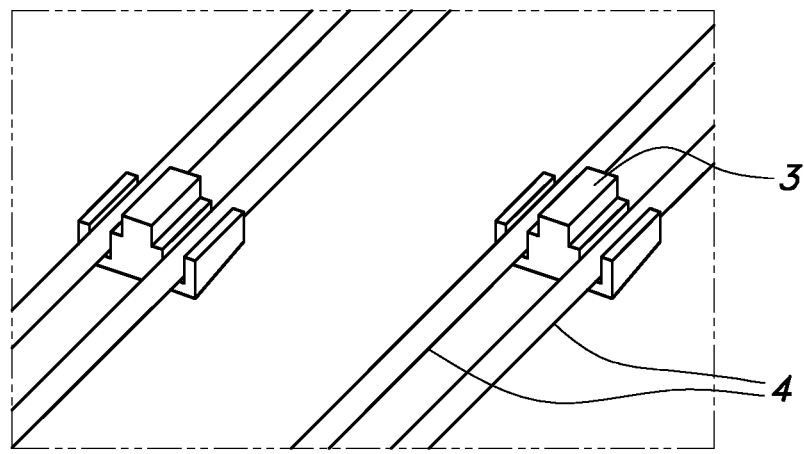
Figure 4C:
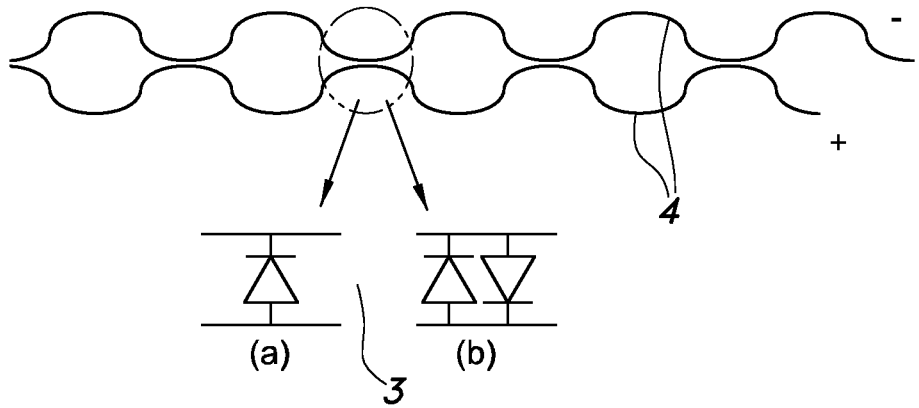

FIGS. 4a-4c shows a chicken-wire embodiment where light sources 210, such as UV LEDs, are arranged in a grid and connected in a series of parallel connections. The LEDs can be mounted at the nodes as shown in FIG. 4b either through soldering, glueing or any other known electrical connection technique for connecting the LEDs to the chicken wires 4. One or more LEDs can be placed at each node. DC or AC driving can be implemented. In case of DC, the LEDs are mounted as shown in FIG. 4c. If AC is used, then a couple of LEDs in anti parallel configuration is used as shown in FIG. 4c. The person skilled in the art knows that at each node more than one couple of LEDs in anti parallel configuration can be used. The actual size of the chicken-wire grid and the distance between UV LEDs in the grid can be adjusted by stretching the harmonica structure. The chicken-wire grid may be embed in an optical medium wherein optionally a parallel grid of scattering features are provided as illustrated in FIG. 3.

Besides anti-fouling application of hulls of ships, the following alternative applications and embodiments are envisioned:

The disclosure can be applied to a wide variety of fields. Almost any object coming into contact with natural water, will over time be subject to biofouling. This can hinder e.g. water inlets of desalination plants, block pipes of pumping stations, or even cover the walls and bottom of an outdoor pool. All of these applications would benefit from the presently provided method, lighting modules and/or system, i.e. an effective thin additional surface layer, which prevents biofouling on the entire surface area.

Although UV light is the preferred solution, other wavelengths are envisaged as well. Non-UV light (visible light) is also effective against biofouling. Typical micro-organisms are less sensitive to non-UV light than to UV light, but a much higher dose can be generated in the visible spectrum per unit input power to the light sources.

UV LEDs are an ideal source for thin light emitting surfaces. However, UV sources other than LEDs can also be used, such as low pressure mercury vapour lamps. The form factor of these light sources are quite different; mainly the source is much bigger. This results in different optical designs, to 'distribute' all the light from a single source over a large area. The concept of light guiding as discussed herein does not change though. Further, a significant contribution of light in desired wavelengths and/or wavelength combinations may be produced.

Instead of using a thin layer that emits UV light outward in a direction away from the protected surface in order to avoid bio-fouling, biofouling could potentially also be removed by applying UV light from the outside in the direction of the protected surface. E.g. shining a UV light onto a hull or surface comprising a suitable optical medium as described. Thus, a single optical medium emitting anti-fouling light in directions to and away from protected surfaces may be even more efficient.

Figure 5A:
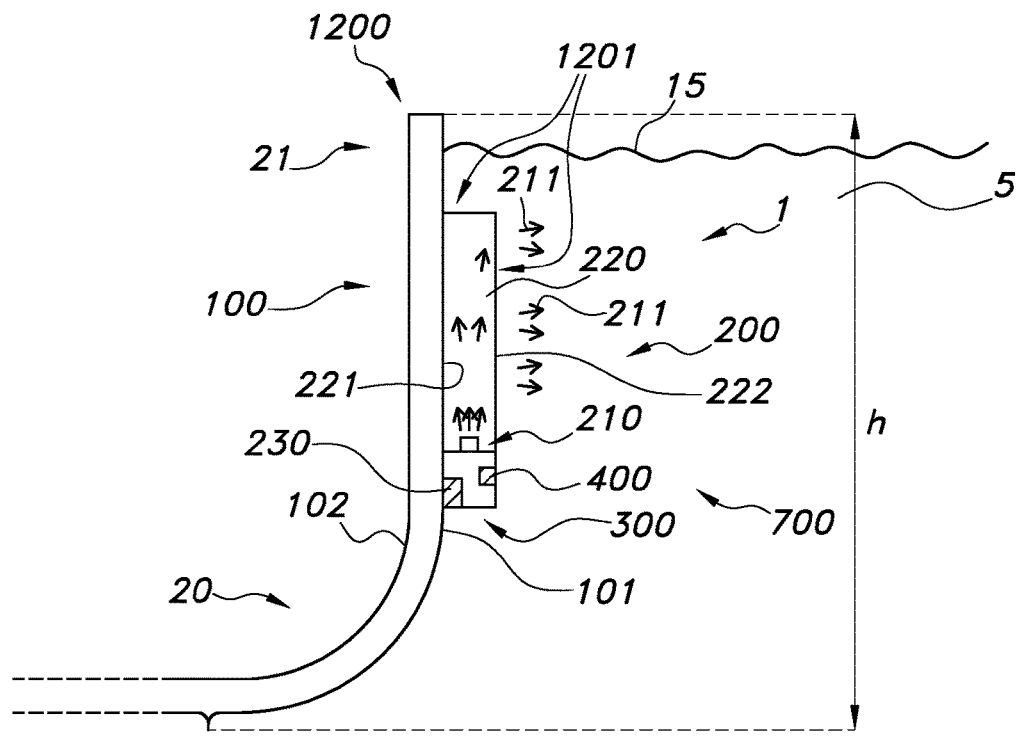
FIGS. 5a-5d schematically depict some aspect of the lighting system as described herein.

FIGS. 5a-5d schematically depict some embodiments and variations of the anti-fouling system. FIG. 5a schematically depicts an anti-fouling lighting system 1 comprising a lighting module 200 and optionally a control system 300. Here, as example of an object 1200 with fouling surface 1201, a vessel 20 with said hull 21 is schematically depicted. The fouling surface 1201 may be (part of) an element 100 and/or the surface of an element or system associated with said object 1200. Element 100 indicates an element of the object, such as e.g. a hull 21 of a vessel 20. In this schematically depicted embodiment, the object 1200 further comprises the anti-fouling lighting system that includes an emissive surface (see below). Hence, the fouling surface 1201 may e.g. also comprise such emissive surface 220.

The element 100 comprises a first element surface 101 and a second face 102, the first element surface 101 comprising e.g. an area of at least 0.4 m$^2$. For instance, the second face 102 can be the internal wall of the hull 21 of a vessel 20 (with reference 23 indicating a keel). The first element surface 101 is the face towards the exterior of, in this embodiment the vessel 20, which will during use at least partly be in contact with liquid 5, especially water. The liquid level is indicated with reference 15. As can be seen, at least part of the element 100 is submerged.

The lighting module 200 comprises a light source and optionally an optical medium 220. Especially, the light source 210 is configured to generate anti-fouling light 211, which may especially include UV light, even more especially at least UV-C light. The optical medium 220 is especially configured to receive at least part of the anti-fouling light 211 and is further configured to distribute at least part of the anti-fouling light 211 through the optical medium 220. The optical medium comprises a first medium face 221, which may for instance have an area of at least 0.4 m$^2$ and an emission surface 222 configured to emit at least part of the distributed anti-fouling light 211 in a direction away from the first medium face 221 of the optical medium 220. Here, the first medium face 221 is directed to the first element surface 101 of the element 100. In this embodiment, the optical medium 220 is in physical contact to the first element surface 101 of the optical element. For instance, in such embodiment at least part of the lighting module 200 is thus configured to seal at least part of the first element surface 101 with the emission surface 222 configured more remote from the first element surface 101 than the first medium face 221. Further, the lighting system 1 comprises a control system 300 configured to control an intensity of the anti-fouling light 211 as function of one or more of a feedback and a timer. The optional timer is not depicted, but may optionally be integrated in the control system. Alternatively, a sensor, indicated with reference 400, may sense a time signal. Reference 230 indicates a power supply, which may locally harvest energy, or which may e.g. be a battery. Optionally, electrical power may be provided from the vessel. Reference h indicates the height of the element 100.

Figure 5B:
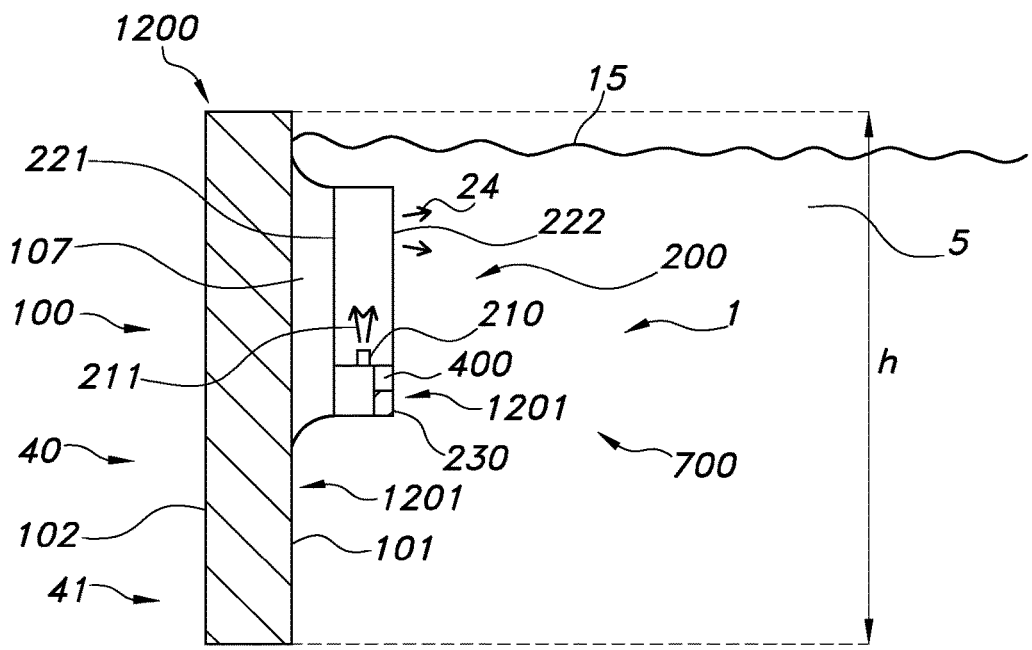
Figure 5C:
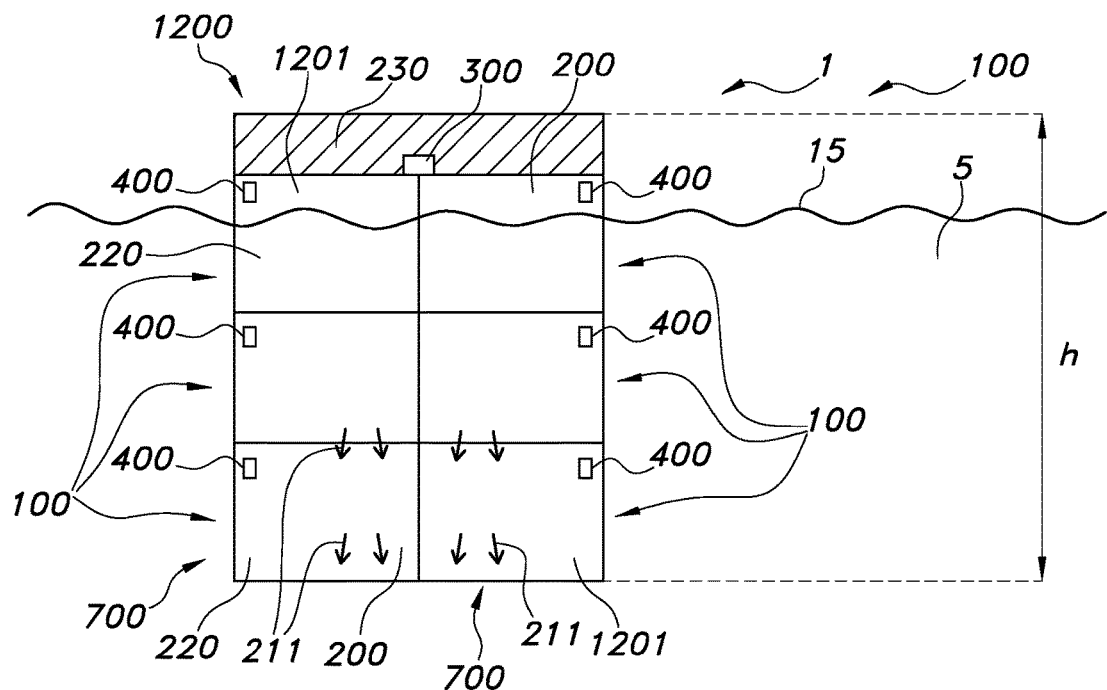
Figure 5D:
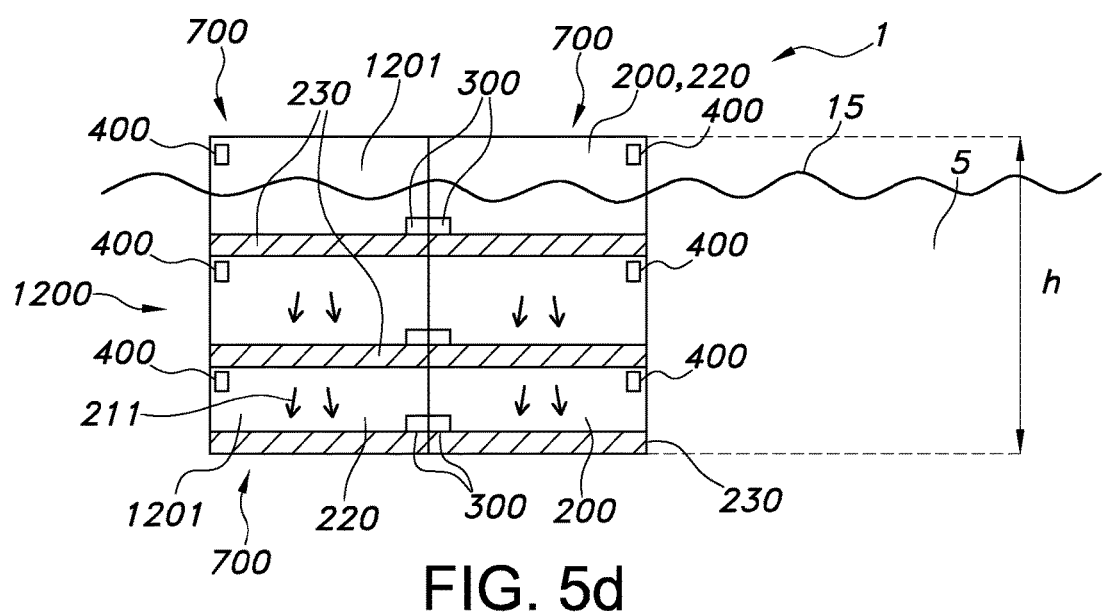

By way of example, the power supply 230, control system 300, and sensor 400 are all integrated in the lighting module 200, and form with the optical medium 220 a single unit. The lighting module 200 may substantially cover the entire element 100. Here, by way of example, only part of the 1$^{st}$ face 101 is covered. In the embodiment depicted in FIG. 5a, the 1$^{st}$ optical medium surface is attached to the 1$^{st}$ face of the element 100. FIG. 5b schematically depicts an embodiment, just by way of example, wherein the optical medium is not attached to the element 100; hereby a void 107 may be created. Note that at least part of the lighting unit seals the first element surface of the element 100. Here, by way of example the element is a wall or door or a moveable construction 40, e.g. a dam or sluice. FIG. 5c by way of examples shows a plurality of elements 100, and also a plurality lighting modules 200. The lighting system includes also a plurality of sensors 400, and a single control system 300. Further, the local energy harvesting system 230 may e.g. a photovoltaic cell. The lighting modules 200 may in an embodiment form a single integrated unit, and seal of as a whole the elements 100. With such system, it may be monitored which optical mediums 220 are below the liquid level 15. Only those which are below the liquid level 15 may provide anti-fouling light 211, as indicated in the drawing. Of course, more than the schematically depicted lighting modules may be available. FIG. 5d schematically depicts individual lighting system 1, which may optionally also be coupled. E.g., the control systems 300 may optionally communicate (wireless). However, the lighting systems may also act independently.

Reference 700 indicates an integrated unit comprising (i) the lighting module 200 and one or more of said sacrificial electrode (see below), said second energy system electrode (see below), an optional control system 300, an optional timer, and an optional sensor 400, wherein the control system 300 may e.g. be configured to control an intensity of the anti-fouling light 211 as function of one or more of (i) a feedback signal from the sensor 400 related to a biofouling risk and (ii) the timer for (periodically) varying the intensity of the anti-fouling light 211.

The integrated unit 700, as for instance shown in some of the schematically depicted embodiments, may especially be a closed unit, with the emissive surface 221 as one of the faces. In FIGS. 5a-5d the electrodes, etc., are not depicted for the sake of simplicity. These will however further be elucidated below with references to FIGS. 6a-6c and 7a-7e.

Note that the fouling surface 1201 may in some of the embodiments (also) comprise the emission surface (222), see amongst others FIGS. 5a-5b.

Figure 6A:
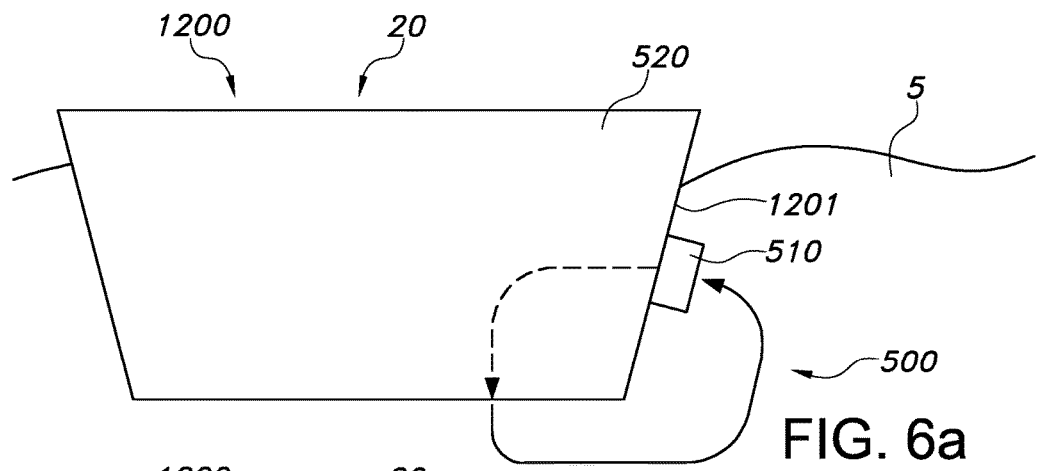
FIGS. 6a-6c schematically depict some aspects of the anti-fouling lighting system and its application.
Figure 6B:
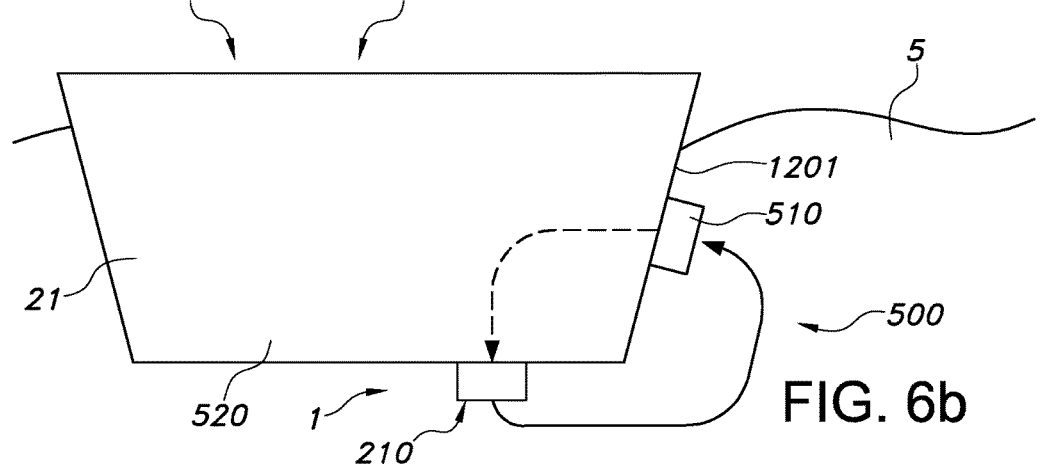
Figure 6C:
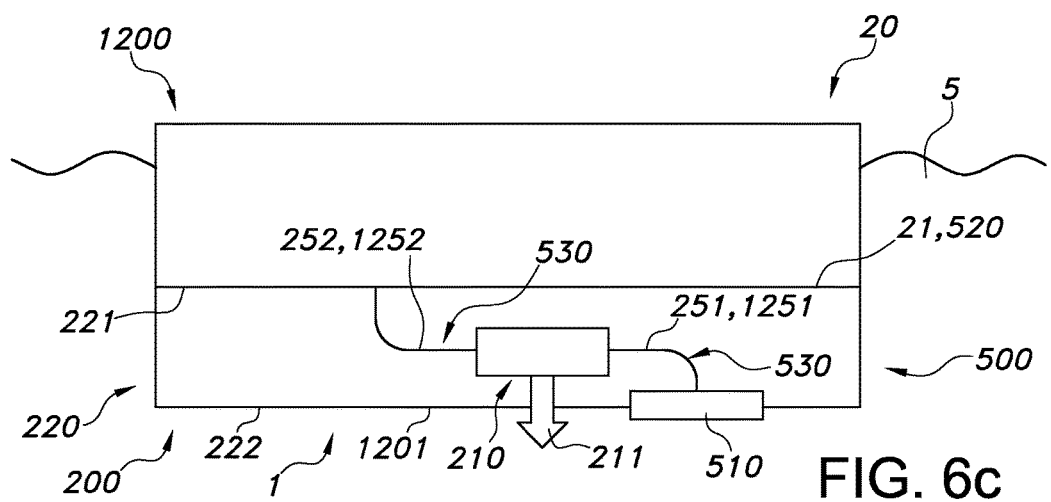

FIGS. 6a-6c schematically depict some aspects of the anti-fouling lighting system and its application. It is for instance an aspect of the invention to insert UV LEDs and/or other light sources 210 into an electrical circuit that may already be available in an object 1200 having a (steel) fouling surface 1201 and a sacrificial electrode 510 attached thereto, see FIGS. 6a-6c for a comparison between the situation without light source 210 (FIG. 6a), and with a light source (FIGS. 6b and 6c). The dashed line indicates by way of example an electrical return path through the steel fouling surface 1201. The steel hull 21, here the fouling surface 1201, may act as a second energy source electrode 520. In this way, energy system 500 is provided, that may be used to power a light source 210. FIG. 6b shows the introduction of a light source 210 which may illuminate the fouling surface 1201, and which may be powered by the energy system 500.

FIG. 6c schematically depicts in more detail an embodiment of the anti-fouling lighting system 1 (here also in an embodiment of the closed unit), wherein by way of example the light source 210 is comprised by an optical medium 220. The anti-fouling lighting system is further elucidated amongst others with respect to this embodiment, but the invention is not limited to this embodiment. FIG. 6c schematically depicts an anti-fouling lighting system 1 configured for preventing or reducing (water related) biofouling on a fouling surface 1201 of an object 1200 that during use is at least temporarily exposed to an electrically conductive aqueous liquid, by providing an anti-fouling light 211 to said fouling surface 1201. The anti-fouling lighting system 1 comprises (a) a lighting module 200 comprising a light source 210 configured to generate an anti-fouling light 211; and (b) an energy system 500 configured to locally harvest energy and configured to provide electrical power to said light lighting module 200, wherein the energy system 500 comprises (i) a sacrificial electrode 510 (in electrical connection with a first electrode 251 of the light source 210), and (ii) a second energy system electrode 520 (in electrical connection with a second electrode 252 of the light source 210), wherein the energy system 500 is configured to provide electrical power to the lighting module 200 when the sacrificial electrode 510 and the second energy system electrode 520 are in electrical contact with an electrically conductive aqueous liquid, such as especially seawater (such as liquid 5). The light source 210 is embedded in the optical medium 220. The optical medium 220 comprises a transit 530 for electrical connections 1251,1252 with the light source 210. Here, two transits are available. Note that the optical medium may be a polymer wherein the entire light source may be embedded. Note that surface or hull 21 is (the element with) the surface to be protected. With the arrangement of the lighting unit 1, especially the optical medium 220 to a substantial part of this surface to be protected, the fouling surface translated to a surface of the lighting unit 1, especially the optical medium. Hence, in this embodiment the anti-fouling light will anti-foul the emissive surface 221. Hence, the fouling surface 1201 here comprises of the emissive surface 222 of the optical medium 220. Therefore, in this embodiment in fact emissive surface 222 is the surface to be protected.

Figure 7A:
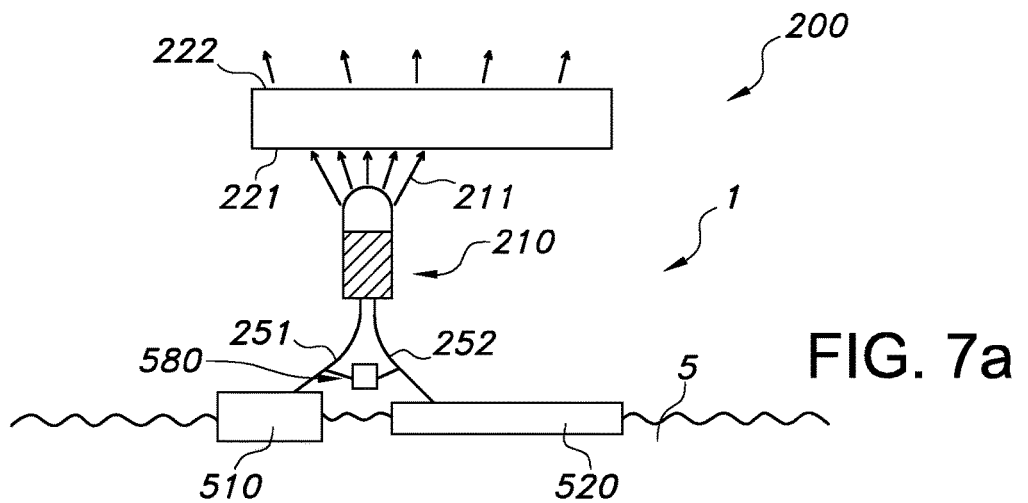
FIGS. 7a-7e schematically depict some aspects of the anti-fouling lighting system and its application.
Figure 7B:
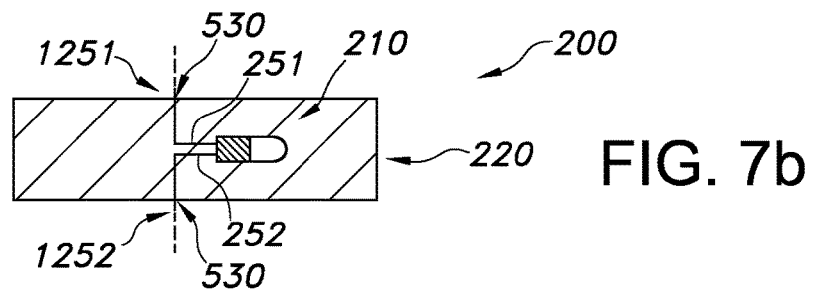

FIGS. 7a-7e schematically depict some aspects of the anti-fouling lighting system and its application. FIGS. 7a and 7b schematically depict in more detail some options and aspects of the invention. Further, FIG. 7a schematically depicts the application of an electrical power enhancer, indicated with reference 580, such as a "joule thieve" to increase a voltage difference between the first electrode 251 and the second electrode 252 of the light source 210. Additional or alternative to such "joule thieve" a boost converter (step-up converter) as electrical power enhancer may be applied. A boost converter is a DC-to-DC power converter with an output voltage greater than its input voltage. It is a class of switched-mode power supply (SMPS) containing at least two semiconductors (a diode and a transistor) and at least one energy storage element, a capacitor, inductor, or the two in combination. A "joule thieve" is a minimalist self-oscillating voltage booster that is small, low-cost, and easy to build; typically used for driving light loads. It can use nearly all of the energy in a single-cell electric battery, even far below the voltage where other circuits consider the battery fully discharged (or "dead"). The circuit may use the self-oscillating properties of the blocking oscillator, to form an unregulated voltage boost converter. The output voltage is increased at the expense of higher current draw on the input. Alternatively or additionally, a flyback converter may be applied. The flyback converter can be used in a DC/DC conversion with galvanic isolation between the input and any outputs. More precisely, the flyback converter is a buck-boost converter with the inductor split to form a transformer, so that the voltage ratios are multiplied with an additional advantage of isolation.

In FIG. 7a, the light of the light source 210 is introduced in the optical medium, such as a fiber or waveguide, from which, optionally after distribution over the optical medium, anti-fouling light may escape (from the emissive surface 222). This anti-fouling light, shown at the top of the drawing, may be used to anti-foul a fouling surface (not depicted). FIG. 7b schematically depicts an option wherein the light source 210 is embedded in the optical medium 220, for instance a silicone foil or tile. The first electrode 251 and the second electrode 252 may extend, here as electrical connections 1251,1252, respectively, through the optical medium and may be accessible from the external from the optical medium 220 via the transits 530. These electrodes may be connected with the respective electrodes of the energy system (not depicted; see above; and see FIG. 7e).

Figure 7C:
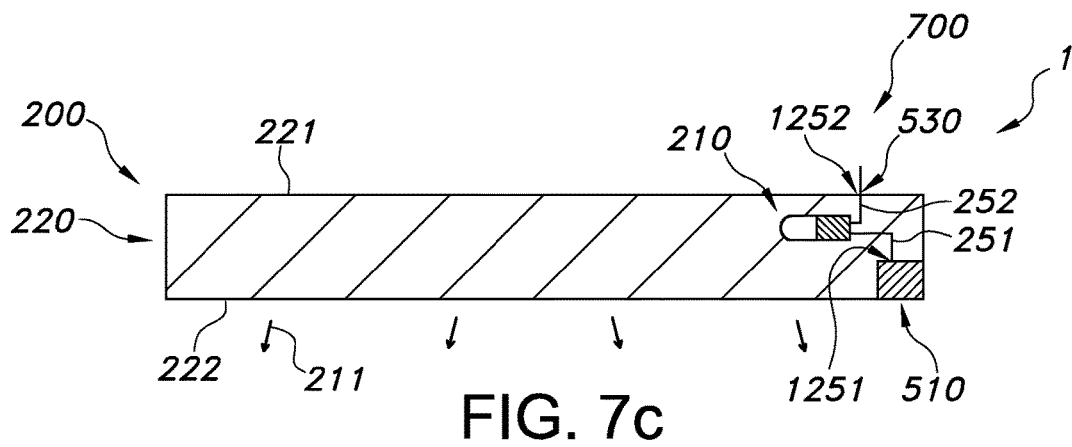
Figure 7D:
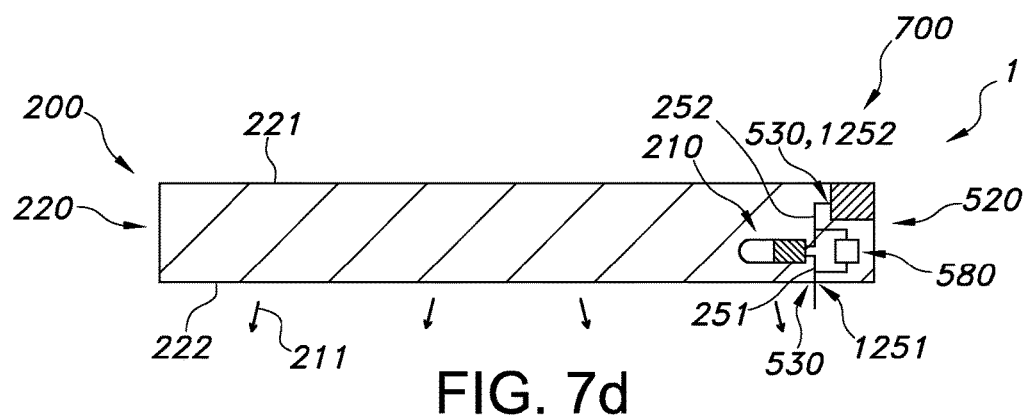
Figure 7E:
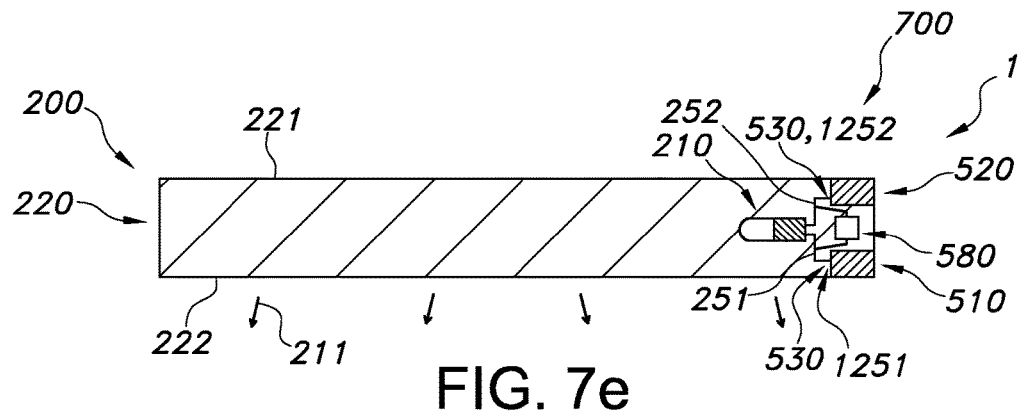

FIGS. 7c-7d schematically depict some embodiments of the lighting unit 1 wherein in an integrated unit 700 several components are provided. The integrated unit 700 may comprising the lighting module 200 and one or more of said sacrificial electrode 510, see FIG. 7c, and said second energy system electrode 520, see FIG. 7d and optionally one or more of a control system (not depicted), a timer (not depicted) and a sensor (not depicted). Combinations of those two embodiments, such as comprising said sacrificial electrode 510 and said second energy system electrode 520, are of course also possible. The embodiment of FIG. 7c may e.g. be attached to a surface of an object 1200 (not depicted), wherein the surface is e.g. a steel hull. This may also apply to the embodiment of FIG. 7d, though this embodiment may already comprise the second energy system electrode, but this unit will also be electrically connected to a sacrificial electrode (not depicted) via electrical connection 1251.

Hence, whereas the embodiment of FIG. 7d may need an object including a sacrificial electrode, to electrically connect to the first electrode 251 of the light source, this embodiment does not necessarily need an object with a steel hull or other element that may be used as second energy system electrode 520, as this electrode is already included in the anti-fouling system 1, especially the unit 700. Hence, the type of surface to which this anti-fouling system 1, especially the unit 700 might be applied, may not be limiting. In contrast, whereas the embodiment of FIG. 7c may need an object including a second energy system electrode 520, to electrically connect to the second electrode 252 of the light source, this embodiment does not necessarily need an object with a sacrificial electrode 510, as this electrode is already included in the anti-fouling system 1, especially the unit 700. Here, the type of surface to which this anti-fouling system 1, especially the unit 700 might be applied, may be more limiting. To provide a completely autonomous system, which may be applied to anti-foul any surface, or to protect any surface, the embodiments of FIGS. 7c and 7d may be combined, as schematically shown in FIG. 7d. FIGS. 7a-7e do not depict other optional component, such as schematically depicted in FIGS. 5a-5d. however, of course also the control system, sensor, timer, etc. may also be available, and e.g. integrated in the unit 700. Further, the energy system 700 may also power such optional electronic components.

Hence, the invention provides an anti-fouling lighting system 1 configured for preventing or reducing biofouling on a fouling surface 1201 of an object 1200 that during use is at least temporarily exposed to an electrically conductive aqueous liquid, by providing an anti-fouling light 211 to said fouling surface 1201, the anti-fouling lighting system 1 comprising: a lighting module 200 comprising a light source 210 configured to generate the anti-fouling light 211; and b an energy system 500 configured to locally harvest energy and configured to provide electrical power to said light lighting module 200, wherein the energy system 500 comprises i a sacrificial electrode 510, and ii a second energy system electrode 520, wherein the energy system 500 is configured to provide electrical power to the lighting module 200 when the sacrificial electrode 510 and the second energy system electrode 520 are in electrical contact with the electrically conductive aqueous liquid.

Depending on the precise metals used for the anodes, and the precise LED being used, the voltage generated may not be enough to directly power the LEDs. In this case, a simple DC-DC converter can generate higher voltage. E.g. a so-called "Joule Thief" can work with a voltage as low as 0.35V. The total power required, and hence amount of sacrificial electrode need, can be estimated as follows:

Energy content is about 368 Amp-hours per pound of Zinc; 1108 Amp-hours for aluminum; A current of 3 mA, at a voltage of 3V, will yield 10 mW of electrical power=1 mW of optical power in the UVC range (@ 1% conversion efficiency)

1 mW of UVC light can prevent bio-fouling on a ~1 m2 area.

For a large boat (10,000 m$^2$), thus 10,000*3 mA=30 A is needed. This consumes (corrodes) one pound of zinc every 12 hours, or about 360 kg/year. Hence, with a relative simply system, and by reusing several already existing components on a ships' hull, a UV anti-fouling system can be powered.

Hence, anti-fouling solutions that release certain chemicals or biocides currently have a large market share. To be effective, these coatings have to provide an environment which is harsh for living creatures. A drawback is that over time—either by intended release, or by the inevitable cleaning of the surface—those chemicals are released into the water. These chemicals quite often remain active, causing adverse effects on the environment. A fundamentally different way of preventing bio-fouling is by using UV light emission. UV light is known to be effective in de-activating or even killing micro-organisms, provided a sufficient dose of a suitable wavelength is applied. An example of such is ballast-water treatment. We will present a new approach for anti-biofouling, in which an UV-light emitting layer is applied on the outside of the hull of a ship. The introduction of UV-LEDs as a light source enables thin, coating like structures, in which the UV light is spread evenly within the surface. Further optical design elements will ensure the light escapes more or less uniformly all over the coating layer. The UV emitting layer will make it reduce the possibility for micro-organisms to attach to the hull or even prevent it. In an experimental setup, we have achieved promising results in keeping a surface free from bio-fouling for an extended period of time. Two elements were arranged in seawater and kept there for four weeks. One was irradiated with UV light; the other was not irradiated with UV light. After four weeks, the former included only fouling at the spot where no UV light was received; the spot itself was free from fouling. The latter element was fully covered with fouling.

The invention claimed is:

1. An anti-fouling lighting system configured for preventing or reducing biofouling on a fouling surface of an object that during use is at least temporarily exposed to an electrically conductive aqueous liquid, by providing an anti-fouling light to said fouling surface, the anti-fouling lighting system comprising:
   a lighting module comprising a light source configured to generate the anti-fouling light; and
   an energy system configured to locally harvest energy and configured to provide electrical power to said lighting module, wherein the energy system comprises (i) a sacrificial electrode in electrical connection with a first electrode of the light source, and (ii) a second energy system electrode in electrical connection with a second electrode of the light source, wherein the energy system is configured to provide electrical power to the lighting module when the sacrificial electrode and the second energy system electrode are in electrical contact with the electrically conductive aqueous liquid.

2. The anti-fouling lighting system according to claim 1, wherein the light source comprises a UV LED configured to provide one or more of UV-A and UV-C light.

3. The anti-fouling lighting system according to claim 1, wherein the sacrificial electrode comprises one or more of zinc and magnesium, wherein the second energy system electrode comprises steel iron, and wherein the anti-fouling lighting system further comprises a voltage difference enhancer configured to increase a voltage difference between the first electrode and a second electrode of the light source.

4. The anti-fouling lighting system according to claim 1, wherein anti-fouling lighting system comprises an optical medium, wherein the optical medium comprises one or more of a waveguide and an optical fiber configured to provide said anti-fouling light to the fouling surface.

5. The anti-fouling lighting system according to claim 1, wherein the lighting module further comprises an optical medium configured to receive at least part of the anti-fouling light and configured to distribute at least part of the anti-fouling light through the optical medium, the optical medium comprising an emission surface configured to emit at least part of the distributed anti-fouling light in a direction away from the optical medium, wherein the fouling surface comprises said emission surface.

6. The anti-fouling lighting system according to claim 5, wherein the light source is embedded in the optical medium, and wherein the optical medium comprises a transit for electrical connections with the light source.

7. The anti-fouling lighting system according to claim 1, wherein the lighting module and one or more of said sacrificial electrode and said second energy system electrode are comprised in an integrated unit.

8. The anti-fouling lighting system according to claim 7, wherein the integrated unit further comprises one or more of a control system and a sensor, wherein the control system is configured to control an intensity of the anti-fouling light as function of one or more of (i) a feedback signal from the sensor, the feedback signal related to a biofouling risk, and (ii) a timer for time-based varying the intensity of the anti-fouling light, and wherein the one or more of the control system and the sensor are also powered by the energy system.

9. The anti-fouling lighting system according to claim 8, configured to provide the anti-fouling light in a pulsed way wherein periods with anti-fouling light are alternated with periods without anti-fouling light.

10. The object according to claim 8, comprising a plurality of lighting modules arranged over at least part of a height (h) of the object, wherein the control system is configured to control an intensity of the anti-fouling light from a lighting module as a function of a position of the lighting module relative to a liquid level of the electrically conductive aqueous liquid at a side of the fouling surface.

11. An object comprising a fouling surface that during use is at least temporarily exposed to the electrically conductive aqueous liquid, the object further comprising the anti-fouling lighting system as defined in claim 1.

12. The object according to claim 11, wherein the object comprises a vessel, wherein the vessel comprises a steel hull, and wherein the hull is configured as second energy system electrode.

13. A method of anti-fouling a fouling surface of an object that is during use at least temporarily exposed to an electrically conductive aqueous liquid, the method comprising:
providing an anti-fouling lighting system as defined in claim 1;
locally harvesting energy by said energy system to provide electrical power to said lighting module;
generating the anti-fouling light by said lighting module; and
providing said anti-fouling light to said fouling surface.

14. The method according to claim 13, wherein the electrically conductive aqueous liquid is seawater.

15. A method of providing an anti-fouling lighting system to an object, that during use is at least temporarily exposed to an electrically conductive aqueous liquid, the method comprising providing a lighting module and an energy system as defined in claim 1, to the object, with the lighting module configured to provide said anti-fouling light to a fouling surface of one or more of the object and the lighting module attached to the object.

* * * * *